US011228923B2

(12) United States Patent
Bogatin et al.

(10) Patent No.: US 11,228,923 B2
(45) Date of Patent: Jan. 18, 2022

(54) DYMNAMIC WIRELESS BROADCAST SYSTEM AND METHOD FOR OPERATING THE SAME

(71) Applicant: Siden, Inc., New York, NY (US)

(72) Inventors: Boris Bogatin, Philadelphia, PA (US); Matthew Bromberg, Wenatchee, WA (US); Narayan Parappil Menon, Syosset, NY (US); John L. Norin, Weston, FL (US)

(73) Assignee: Siden, Inc., New York, NY (US)

( * ) Notice: Subject to any disclaimer, the term of this patent is extended or adjusted under 35 U.S.C. 154(b) by 0 days.

(21) Appl. No.: 16/880,867

(22) Filed: May 21, 2020

(65) Prior Publication Data

US 2020/0374713 A1 Nov. 26, 2020

Related U.S. Application Data

(60) Provisional application No. 62/851,842, filed on May 23, 2019.

(51) Int. Cl.
*H04W 24/02* (2009.01)
*H04B 7/0417* (2017.01)
(Continued)

(52) U.S. Cl.
CPC ............ *H04W 24/02* (2013.01); *H04B 7/043* (2013.01); *H04B 7/0417* (2013.01);
(Continued)

(58) Field of Classification Search
CPC ....... H04W 24/02; H04W 8/22; H04W 88/08; H04W 24/10; H04W 88/085;
(Continued)

(56) References Cited

U.S. PATENT DOCUMENTS

2011/0059706 A1\* 3/2011 Harel .................. H04B 1/3838
455/115.1
2016/0028448 A1 1/2016 Park et al.
(Continued)

FOREIGN PATENT DOCUMENTS

EP 3456083 B1 3/2020

OTHER PUBLICATIONS

International Search Report and Written Opinion dated Jul. 17, 2020 in corresponding PCT/US2020/034247.

*Primary Examiner* — Hassan Kizou
*Assistant Examiner* — Abdullahi Ahmed
(74) *Attorney, Agent, or Firm* — Harness, Dickey & Pierce, P.L.C.

(57) ABSTRACT

A method of operating a communication system includes communicating a sounding signal to a plurality of devices through a first antenna array coupled to a basestation. The method further includes, in response to the sounding signal, communicating a response signal to the basestation from each of the plurality of devices, from the response signal determining device data comprising a device location, a signal strength of the sounding signal and phase information of the sounding signal, grouping the plurality of devices into a first group based on the device data, generating first transmit beamforming weights for the first group to shape the power output of the first beamforming weight vector to communicate a data signal to the first group and broadcasting the data signal to the first group through a wireless signal from the first antenna array using the first transmit beamforming weights and nulls.

89 Claims, 25 Drawing Sheets

(51) Int. Cl.
*H04B 7/0426* (2017.01)
*H04B 7/06* (2006.01)
*H04W 8/22* (2009.01)
*H04W 88/08* (2009.01)

(52) U.S. Cl.
CPC ......... *H04B 7/0617* (2013.01); *H04B 7/0621* (2013.01); *H04W 8/22* (2013.01); *H04W 88/08* (2013.01)

(58) Field of Classification Search
CPC ..... H04W 8/186; H04B 7/0417; H04B 7/043; H04B 7/0617; H04B 7/0621; H04B 7/0695; H04B 7/0626; H04B 7/024
See application file for complete search history.

(56) References Cited

U.S. PATENT DOCUMENTS

| | | | |
|---|---|---|---|
| 2018/0138958 A1* | 5/2018 | Asplund | H04W 72/046 |
| 2019/0223029 A1* | 7/2019 | Clarke | H04W 72/0453 |
| 2020/0243985 A1* | 7/2020 | Petersson | H01Q 21/10 |
| 2020/0358646 A1* | 11/2020 | Lincoln | H04B 7/0695 |
| 2021/0098873 A1* | 4/2021 | Veysoglu | H04B 7/0408 |

* cited by examiner

DYMNAMIC WIRELESS BROADCAST SYSTEM AND METHOD FOR OPERATING THE SAME

CROSS-REFERENCE TO RELATED APPLICATIONS

This application claims the benefit of U.S. Provisional Application No. 62/851,842, filed on May 23, 2019. The entire disclosure of the above application is incorporated herein by reference.

TECHNICAL FIELD

The present disclosure relates generally to wireless broadcast systems and, more specifically, to a method and system for using user device feedback to dynamically control the broadcasting of data signals including content to users to effectively improve the overall total performance of the broadcast system.

BACKGROUND

The statements in this section merely provide background information related to the present disclosure and may not constitute prior art.

In many regions, internet service underperforms relative to the amount of content consumption that is desired. That is, many areas of the country and around the world do not have sufficient high-speed internet access. For example, wireless, dial-up, DSL, or satellite services are examples of services that may not provide adequate speed or economical capacity to support the downloading of high quality of video content or other large forms of data in a timely or economic manner. However, over-the-top (OTT) video services are becoming increasingly commonplace in the United States market and globally, rapidly not only offering an attractive alternative to traditional cable bundles but beginning to replace "Pay TV" altogether. However, many consumers across the U.S. and globally, whether in urban areas or in rural areas, either desire to adopt a competitive service to a cable bundle to reduce cost or to gain access to additional features (as in the case of mobility and portability as with wireless services) or to enhance their existing slower speed or lower capacity services to support a viable over-the-top video or data intensive service. Enabling these slower speed or lower capacity services to support high quality OTT video and data delivery is desirable.

A large number of people are dropping traditional cable television service in favor or over-the-top services. This contributes to the volume of data used to watch videos. Nearly half of the approximately 125,000,000 households in the United States now subscribe to at least one video streaming service. By one estimate, the amount of traffic attributable to the most popular video services such as Netflix®, Amazon Prime Video® and iTunes® together account for more than 40% of all peak internet traffic in the U.S. Another 18% is attributable to YouTube®. Ultra-high definition (UHD) content is also beginning to appear on the market. Thus, the increase in internet traffic is expected to grow for the foreseeable future. For Netflix® service, a 5 Mbps is recommended for HD content. However, for ultra-high definition content, a 25 Mbps connection is recommended. Ultra-high definition streams may consume up to 7 GByte per hour.

Today, it is estimated that 20,000,000 Americans lack access to 10 Mbps+ service, and that number grows to roughly 1.6 billion global households. Their options range satellite broadband and long-loop DSL connections for those that can afford it, or a mobile broadband only solution to their smartphones across many of the other parts of the world where even satellite or DSL broadband is unaffordable. Same time, a rapidly growing trend in lower income households, and even more so in the cord-cutting focused youth segments of the population, is using as mobile service as a preferred means to access video data, while shedding the more expensive fixed wired broadband.

The provisioning of increasingly higher speed wireless data connectivity has been the focus of wireless carrier infrastructure growth for several decades, and has accelerated with the rapidly rising demand by consumers to stream video to each or any of their devices, irrespective of where they are. The increasing wireless performance, together with both users' desires to consume more bandwidth intensive video content over the Internet, at lower marginal cost per bit, and wireless providers desire to serve more of the users' demands including in the home and also to large screen devices (i.e., TVs, laptops), is placing a requirement on wireless networks to accommodate a markedly higher level of capacity for handling this exploding video data traffic demand over wireless networks.

Today wireless networks are still approaching video distribution using traditional means, which can be improved upon. Video data traffic is carried over wireless networks at the same time that consumers desire to consume the video data traffic. Since consumers consume data at times driven largely by social structures, with significant consumption happening at the same time across the consumer base including during "prime time" hours, time intervals of significant "peak" consumption are typical and wireless networks often have insufficient capacity to handle peak loads. Further, consumers mostly consume different content than other consumers at any given point of time, precluding efficient use of broadcasting content to users for real-time consumption (since has low relevancy) outside of select live content (i.e., sports events, time-scheduled releases of popular shows).

The 3GPP standard eMBMS feature that was designed to be used for broadcast has struggled to gain adoption with carriers in their deployments in the manner in which it was designed. There are few cases, when instantaneously broadcasting video to many users at the same time, relieves real-time traffic requirements. To complicate the problem, eMBMS also requires designing the broadcast for the worst case user, in a blind manner without feedback, otherwise they would not be successfully served. A single sector carrier is broadcast with a single broad azimuthal antenna beam pattern that must be configured in a low spectral efficiency mode (measured in bits per second per hertz, bps/Hz) to ensure robust transmission to all potential recipients that may be in edge-of-cell or interference-prone locations. As such, broadcasting traffic at worse performance rate and lower efficiency per hertz, than unicasting the traffic, with very few if any users other than the requesting user interested in the real-time data transmission at that time, has rendered wireless broadcasting to a niche application class.

However, consumers consume largely the same long-form content, i.e., blockbuster movies and hit TV series as other consumers, over a longer period of time, so it is possible to "predict" what a consumer would consume with higher accuracy if the real-time requirement is relaxed to "over 3 months" or some other such longer than real-time timeframe. A system that would identify the content generally desired by consumers, that would broadcast the content over the networks in advance of the time it is desired to be consumed by consumers that would store the content locally at the consumers' premises, and serve the content to consumers over an unconstrained medium (i.e., home WiFi network), would be able to relieve wireless networks from significant amount of video data content and corresponding congestion, since broadcasting to many users at once, even done to "predict" future consumption, can be dramatically more spectrally efficient than unicasting something to only one user at the time that the user requests the content. Further, if such a system performed its broadcast distribution during the times when the wireless networks had "spare capacity", not needed for real-time traffic needs, the system would be able to relieve wireless networks even further.

To address the increasing demand for wireless capacity density, carriers are looking to 5G and "massive MIMO" types of solutions. Many of the 5G solutions require increasingly larger channel bandwidths, found at higher and higher frequencies. As these frequencies increase, the relative antenna sizes per element decrease inversely with frequency. This has helped to enable more complex active antenna array systems with many more elements that, with the proper computational processing, can create "massive MIMO" basestations. These basestations can create many smaller, more focused antenna beams, which allow the spatial re-use of the same frequencies more than once in what was routinely a 120 degree azimuthal sector.

Some academic papers discuss the concept of broadcast in a "massive MIMO" environment, with the conclusion that the superposition of unicast beam solutions can provide a representation of a broadcast beam, but that beam is no more spectrally efficient than providing n-copies of the desired content to the n-number of users using n-number of unicast beams, i.e., it does not create a breakthrough over unicast in such an environment.

SUMMARY

The present disclosure enables new use of wireless infrastructure to much more effectively meet the rising video content demand using a broadcast enabled model. While the system is envisioned for fixed/residential customers, other non-fixed location devices, portable and mobile devices may benefit from the teachings herein.

In one aspect of the disclosure, a method of operating a communication system includes communicating a sounding signal to a plurality of devices through a first antenna array coupled to a basestation. The method further includes, in response to the sounding signal, communicating a response signal to the basestation from each of the plurality of devices, from the response signal determining device data comprising a device location, a signal strength of the sounding signal and phase information of the sounding signal, grouping the plurality of devices into a first group, generating first transmit beamforming weights for the first group to shape the output of the first antenna array to communicate a data signal to the first group and broadcasting the data signal to the first group through a wireless signal from the first antenna array using the first transmit beamforming weights and nulls.

In another aspect of the disclosure, a processing unit coupled to a basestation includes an antenna array associated with the basestation communicating a sounding signal to a plurality of devices. An optimization circuit receives a response signal from each of the plurality of devices and, from the response signal, determines device data comprising a device location, a signal strength of the sounding signal and phase information of the sounding signal. The optimization circuit groups the plurality of devices into a first group based on the device data. A beamformer generates first transmit beamforming weights for the first group to shape the output of the first antenna array to communicate a data signal to the first group. The antenna array broadcasts the data signal to the first group through a wireless signal from using the first transmit beamforming weights and nulls.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1A:
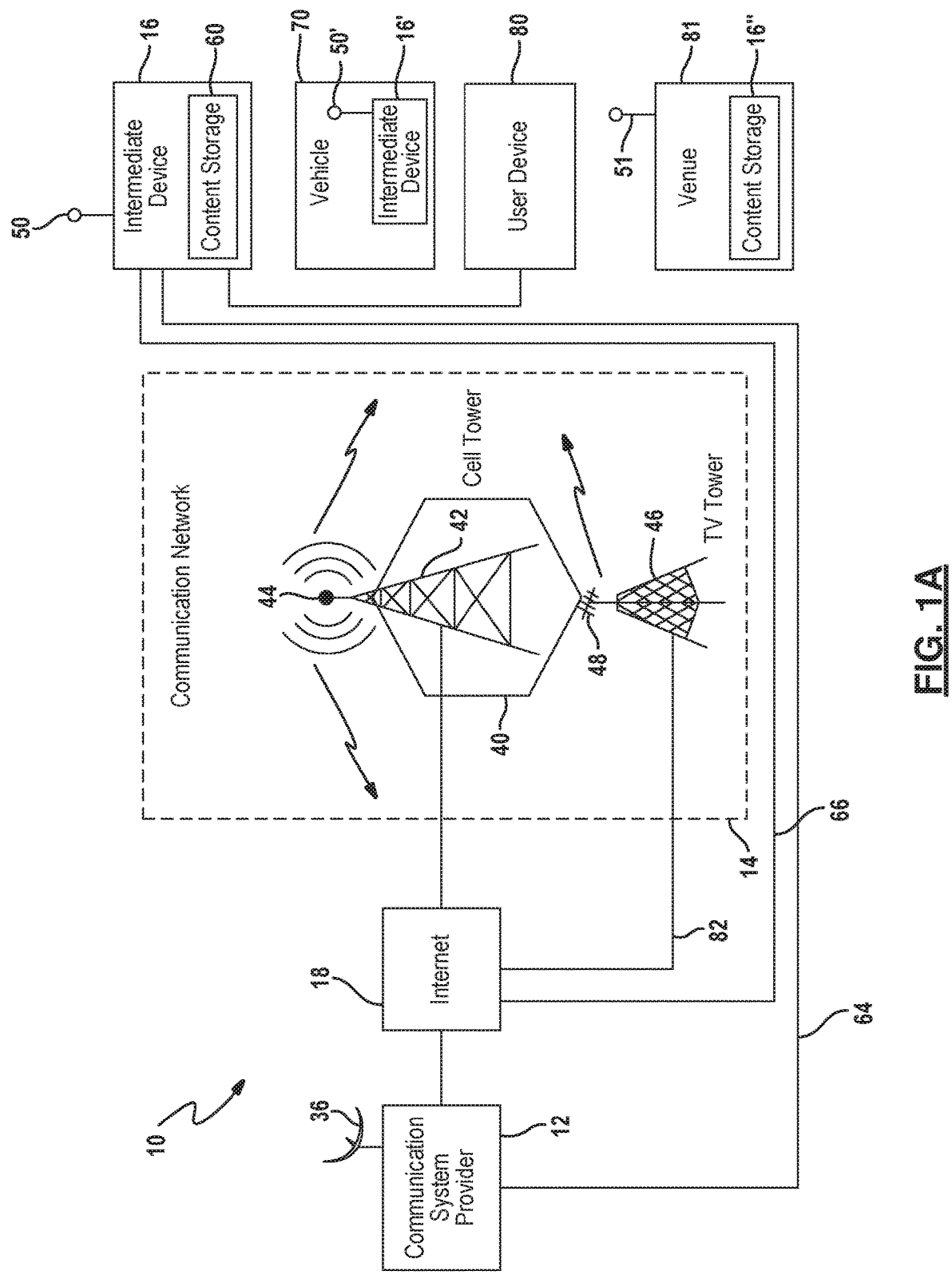
FIG. 1A is a high level block diagrammatic view of a first example of a communication system.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure. The teachings of the present disclosure can be implemented in a system for electronically communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented electronically in analog circuitry, digital circuitry or combinations thereof. Further, the computing device may include a microprocessor or microcontroller that performs instructions to carry out the steps performed by the various system components. A content or service provider is also described. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, software, software updates, IoT data, weather, application, application data, "best of web" content, e-delivery of materials, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein.

While the following disclosure is made with specific broadcast services and systems, it should be understood that many other delivery systems are readily applicable to disclosed systems and methods. The systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, or mobile distribution systems, power-line broadcast systems, any point-to-point and/or multicast Internet Protocol (IP) delivery network, and fiber optic networks. Further, the different functions collectively allocated among a service provider and intermediate devices as described below can be reallocated as desired without departing from the intended scope of the present disclosure.

User devices may be coupled to the Internet through a constrained network or not even coupled to the Internet at all. In a constrained network, the speed or available resources may not be sufficient to provide a quality level of service. In the present examples, remnant capacity of the constrained network or a second less constrained network may be used to pre-position content at an intermediate device. The prepositioned content may then be provided from intermediate device storage directly or through a second communication network (i.e. local network) when demanded at the user device for real time consumption, without having to rely on using the constrained network for that real-time consumption.

Remnant capacity is a resource or a plurality of resources that are not being used for transmitting data or content by a content system provider during regular customer use. Regular use of a communication network for primary customers may be referred to as a primary use. Remnant capacity may be referred to as a secondary use and may be governed between agreements between a content provider and a communication system provider. The content provider may wish to provide a service to users using the remnant capacity. Users may not be aware of the path the content traverses. Remnant capacity may also include resources that have a lower priority that can be allocated to another use. In the simplest sense, remnant capacity is a data path or bandwidth that is increasingly left unutilized during non-peak times of network use. Inversely, there is limited remnant capacity available during the peak times of network use. In all cases, the peak time of network use is characterized as the time when most of the usage of the services offered by the network is taking place by the network's users or direct customers. The non-peak time is the time when the least usage of the services is taking place by their users. For example, in a long term evolution wireless network (LTE) system, remnant capacity may be the bandwidth not being used for voice or data content requested from users in real time. In the cases of "spectrum re-use", capacity used by some users for real-time consumption of some content during peak times, may leave remnant capacity at the same time, as capacity that is either unusable by other users for real-time consumption of other content or only usable by other users for real-time consumption of the same content, if that content is broadcasted instead of unicasted. In the cases of "network re-use", capacity used by some users for real-time consumption of content during peak times, may leave remnant capacity at other times, as capacity that is not demanded to be used for real-time consumption of content by other users at these times as they are non-peak-times and are not of interest to users to use at the times (the interest to users to use as why there is a peak time in the network after all).

The remnant capacity may be used in various ways by intercommunication of the intermediate devices, the communication system provider, and the content service provider. In the cases of "spectrum re-use", there have been many efforts to generate additional parallel uses of the same spectrum for real-time consumption by multiple users, using the same spectrum. However, utilizing remnant capacity, an almost infinitely high (as far as the number of users benefitting) amount of re-use can be generated by simply broadcasting this content, instead of unicasting it, and by having some users use it for real-time consumption, and for the remnant capacity to be used for non-real-time consumption by storing this same content at other intermediate storage devices at this same time, and then accessed by other users during a different time in the future, directly or using other communication networks, which may also be less constrained than the network described herein. Further, in the cases of "network re-use", today this remnant capacity goes largely unutilized as operators have had a challenging time of incentivizing "changes in user behavior" to use the network more during "off-peak" times than they otherwise would like for real-time consumption—the benefit to consumers of using the network during peak times for real-time consumption instead of during off-peak times, far outweigh any incentives or benefits which the operators can pass on to the consumers to shift their real-time consumption. However, the remnant capacity can be used in-full for non-real-time consumption, by unicasting or broadcasting content using remnant capacity and by storing this content at other intermediate storage devices, and then accessed by other users during a different time in the future, directly or using other communication networks, which may be less constrained than the network described herein.

Queries as to the current availability of capacity and the upcoming availability of capacity, including real-time consumptions and the remaining capacity, may be formed in order to identify the availability of remnant capacity. Further, Quality of service (QoS) prioritization using evolved multimedia broadcast and multicast services (eMBMS) quality class identifiers, as well as quality-of-service class identifiers (QCIs) used in any wireless or other communication system, may be performed, providing higher QCI levels to traffic for real-time consumption, while leaving traffic for non-real-time consumption on lower QCI levels, effectively rendering it to use of remnant capacity only.

Prioritization of content to be communicated using the remnant capacity may be formed. Delivery of content using remnant capacity may be queue-driven. All of the content to be delivered may be placed into the queue with attributed priority levels for each portion of content, and then served from the queue automatically upon remnant capacity availability, coordinating which content is served in which sequence per what rule. Content may also be retransmitted using remnant capacity. User preferences (queuing), missing content (error correction), content most popular for some users (personalization), content most popular for most users (popularity or short-tail optimization), as well as the remainder of content may all be used in prioritizing within queues.

The present system provides a high-capacity broadcast delivery system or a targeted unicast delivery system. The system may be used for pre-positioning content by combining the strategic use of excess capacity or remnant capacity in a content communication network with pre-positioning content close to the users by caching and storage of the content at local content stores, to allow users to access a large amount of content such as over-the-top (OTT) content, software updates, or other highly intensive data applications without needing to traverse the content communication network at the time the content is desired. This system may use the remnant capacity of a system over the same exact spectrum (in the case of spectrum re-use) as real-time consumption by broadcasting content to users including to those requesting it for real-time consumption and to others using the remnant spectrum capacity for pre-positioning, instead of just unicasting it to only the users requesting it for real-time consumption, or over remnant capacity left-over from non-peak-use of networks for real-time consumption, by unicasting or broadcasting content for pre-positioning. As will be further described below, the system may use remnant capacity of different types of communication systems including but not limited to mobile or cellular systems such as an LTE system, a satellite system or a digital television system. Content such as video content may be provided to an intermediate device which stores the content therein. When users request content for real-time consumption, the content may be provided from the stored or cached content store, rather than requiring that content to be served by the content communication network in response to users' requests and subjecting users to slow speeds of the constrained content communication network or from further burdening the content communication network. A wide variety of video programming including movies, television, shows, documentaries and news may be provided based upon user preferences. Also, other types of video programming such as instant replays may also be provided to users. The system may also be used to provide software and user application updates for various types of users that are coupled to the intermediate device. The system may also be used for defense purposes or purposes in which high amounts of data are required, but whereas the data may be pre-positioned at the local content store by the content communication network and not be required to be delivered from the source of the data on a live or real-time basis.

The system is particularly suitable for rural customers, customers in markets with lower speed, lower capacity networks, or customers of companies that want to utilize their lower speed networks to offer an equivalent of high speed cable or fiber network offerings, to have access to large data, over-the-top services or other large data applications. Specifically, the system may also allow non-rural or other customers to use wireless, satellite, TV, or DSL or other wired networks to effectively meet their content demands, without the need for an additional high-speed cable or fiber network offering. Thus, large data content, including over-the-top content (OTT) video, software updates, and other large data, may be offloaded to be served by the present system while the lower speed content communication network serves users' real-time/live voice and data requests, that cannot be pre-positioned effectively, using peak or regular capacity, and thus the need for high-speed cable or fiber network offerings within the home may be eliminated so that expenses may be reduced. The system may also allow congestion on even high speed cable and fiber networks, or any of the aforementioned networks, to be alleviated by combining content delivery through pre-positioning and subsequent use from local content stores and by serving users' real-time/live voice and data requests, that cannot be pre-positioned effectively, using peak or regular capacity, in a unified system. Further, this system may also increase the effective capacity of broadband networks by using a much greater portion, or the entirety, of a content communication network's capacity, by using the combination of remnant capacity for pre-positioning of content and subsequent use from local content stores, and peak or regular capacity for serving users' real-time/live voice and data requests. If content that is likely to be downloaded to the user is pre-positioned at the local content store, or the intermediate device, and then served from the intermediate device, the need to instead use the content communication network on a real-time/live request basis is reduced, especially in peak hours. Pre-positioning of large data, including over-the-top video and software updates, frees the capacity of mobile and fixed broadband networks for other real-time content requests, real-time two-way communications, or other live content consumption, especially during peak times. By combining a pre-positioning, remnant capacity approach with a real-time voice and data request, peak or regular capacity approaches, lower speed broadband service providers may compete head-to-head with established cable or fiber providers while any of the aforementioned networks improve their performance by leveraging such a combination of approaches.

It is also desired for a system to be able to serve users requests from a first user for real-time consumption, using broadcast mode transmissions, not only when there are other users desiring the same content for real-time consumption (like in the case of the mode described in eMBMS), but also when there are other users who may desire this content for non-real-time consumption, in order to store this same content as in the first user's request in intermediate storage and then to access this content for real-time consumption but in the future, at a later time. When a first user requests to access content, instead of serving that first user's request using a unicast mode transmission, the system can instead serve that first user's request using a broadcast transmission, allowing that first user and any other user, desiring to access that content for real-time consumption, to real-time consume that content; while at the same time, the remnant broadcast transmissions to be able to be received by devices of any and all other users addressable by the broadcast transmission for non-real-time consumption, to store the content in those devices and for such any and all other users to access the content directly from their devices for real-time consumption at some later time.

The system may make determinations of when it is advantageous to serve a given first user's request using a unicast transmission, as unicast transmissions are today higher throughput and have higher spectral efficiencies than broadcast transmissions on the order of 50-1,000%, and when it is advantageous to instead serve the first user's request using a broadcast transmission, where even though a broadcast transmission may be 50-1,000% disadvantaged in throughput and spectral efficiency than a unicast transmission, there are more than 50-1,000% more users than the first user which would benefit from having this request be received and stored by their devices for non-real-time consumption, and accessed for real-time consumption at a future time. This could involve analysis of not just how many users may benefit, but the likelihood of how many users may benefit based on analysis of their usage preferences, the popularity of the content in the request, and the likelihood that the cost of serving those users using unicast transmissions at a future time will be greater than the cost of using a broadcast mode transmission vs a unicast mode transmission at the current time.

Further, the system could also include a mechanism for determining whether any given device should receive the remnant capacity broadcast and store the data for non-real-time consumption, or if it should simply let it pass by. This determination could be based on its current available storage, the content already stored on that device for non-real-time consumption, and the content scheduled to be delivered to that device for non-real-time consumption, and the relative value of the opportunistic broadcast data and the cost of receiving it and storing it versus the value of the content already stored on that device or scheduled to be delivered to that device for non-real-time consumption.

For example, a first user desires to watch a movie #1, which is a relatively popular film, and requests it to be delivered for real-time consumption. The system analyzes that only 10% of the users in the same area as the first user, have movie #1 already stored on their devices for non-real-time consumption, but that of the remaining 90% of the users, 70% of those 90% or 63% would have a high likelihood of consuming movie #1 at a future time if it was stored on their devices for non-real-time consumption. The system serves movie #1 to the first user using a broadcast transmission instead of a unicast transmission, while having the other 63% of the users in the area as the first user receive the remnant broadcast transmission and store movie #1 for non-real-time consumption by these 63% of the users. In the future, some of these users whose devices stored movie #1 for non-real-time consumption, request to watch movie #1 at some future times, and movie #1 is served to them directly from their devices instead of using the network.

The system incorporates several enhancements which alone or in combination provide improvements over known broadcast systems. For example, the system may us 1) a channel feedback mechanism from all data user terminals, inclusive of active unicast and active and potential broadcast terminals, 2) optimized multi-element active antenna array generated broadcast beams, and 3) substantial storage of broadcasted data at the user terminal and serving of the data when requested for real-time consumption locally from the user terminal.

With the presence of channel feedback and active antenna arrays, substantial improvement over traditional eMBMS wireless broadcast may be achieved. By specifically optimizing the antenna pattern to a given device, so that in addition to the incident device receiving an optimized beam transmission a multitude of relatively similarly situated user terminals can receive such a transmission as the incident device on a residual basis, the overall spectral efficiency of the transmission may be increased substantially. The system uses the massive MIMO/beamforming benefits of extra performance for a given transmission, and the broadcast benefits of multiple user terminals receiving the information within the same transmission.

Furthermore, by combining the residual products of two or more optimized beam transmissions for incident devices, the relatively similarly situated user terminals may receive multiple discrete beam transmissions, combine them at their radio, and as a result achieve an ever more robust outcome as a result. The residual product combining may be opportunistic from the receiving user terminals or may be pre-planned by the network, in order to ensure that by combining multiple residual products, the similarly situated user terminals receive sufficiently high SINR signals in order to properly decode the modulated transmissions.

Of course, by also leveraging high capacity digital storage at the user terminals, typically in the form of magnetic or solid state devices, the optimized broadcasts may be collected at user terminals or intermediate devices, the content from the broadcasts may be stored there, and then the content may be served to users either at the same user terminals or locally over WiFi to other user terminals. This essentially allows the use of wireless capacity when and if available to distribute the video, on a broadcast basis to user devices, separately from and in advance to when the video is requested by users to be played in real-time, which in turn is addressed locally to the users without needing to traverse the congested wireless networks at that time.

Referring now to FIG. 1A, a high level block diagrammatic view of a communication system 10 is set forth. In this example, a communication system provider 12 is a system that is in communication with a communication network 14 and controls the operation of the communication network 14. The communication network 14 is in communication with an intermediate device such as an intermediate device 16. The communication system provider 12 is used for controlling the communication network 14. The communication network 14 may be in direct connection with the communication provider or to the internet 18. The communication system provider 12 controls the schedule and placement of content through the communication network 14. The communication system provider 12 may receive content from various sources as will be described further below.

The communication network 14 is in communication with the internet 18. The communication network 14 may be a single stand-alone network or may be a combination of networks.

The communication network 14 may include a cell tower 42 disposed within a cell 40, or any other wireless transmission device, having an antenna array 44 (or antennas) thereon. The antenna array 44 may represent a cellular antenna, a Wi-Fi antenna, or any other wireless transmission antenna of the cell tower 42 and may communicate content wirelessly to the intermediate device 16 through the antenna array 44, from the communication system provider 12, including also wirelessly through the antenna array 44.

The communication network 14 may also include a television tower 46 having an antenna 48 thereon. The TV tower 46 may communicate content to the intermediate device 16 from the communication system provider 12.

In all communication system cases, the communication network 14 may communicate using remnant capacity as will be further described below. The remnant capacity may include various types of resources, that are not being used for serving users' real-time/live voice and data requests and their real-time/live voice and data consumption, and that are more ideally used for pre-positioning of content to the intermediate device 16. As mentioned above, the communication network 14 may effectively distribute (pre-position) content on a non-real-time basis to the intermediate device 16, for subsequent consumption by users directly from the intermediate device 16 instead of from the communication network 14. The remnant capacity of one or more networks may deliver content to the intermediate device 16. The communication network 14 may be wireless.

The communication network 14 may communicate with the local area network 310, which would in turn communicate the content to the intermediate device 16, or the intermediate device 16 directly, using various types of access systems so that a maximum amount of content may be provided to the various intermediate devices. For example, the communication network 14 may use frequency division multiple access, timed division multiple access, spatial division multiple access, code division multiple access and orthogonal frequency division multiple access. Depending upon the requirements of the system and the types of systems provided, different types of access protocols may be used.

The intermediate device 16 may also have an antenna 50 disposed thereon. The antenna 50 may communicate with the antenna array 44 and the antenna 48 of the communication network 14. By making the intermediate device portable the antenna 50 may be placed in a position of high reception. The intermediate device 16 may act as a small cell.

The intermediate device 16 may also include a content storage 60. The content storage 60 may include a solid state content storage, a hard disk drive or a combination of both. The content storage 60 may be designed to hold a substantive amount of data on the order of multiple terabytes or greater. The content storage 60 is used to store pre-positioned content received through either the antenna array 44 or the antenna 50. The intermediate device 16 may also be in communication with a back haul network 64. The back haul network 64 may be part of the communication network which, as demonstrated, is presented as wireless systems. The back haul network 64 may be a wireless network as well.

The system 10 may be suitable for prepositioning content using a wired network 66 as well. That is, the intermediate device 16 may also be coupled to the Internet 18 through the wired network 66. Content may be prepositioned using the remnant capacity of the wired network 66 as will be described below. The wired networks may be a DSL network, a cable network, or a fiber network.

The communication network 14 may also be in communication with a vehicle 70. The vehicle 70 may include an intermediate device 16' configured in the same manner as that of the intermediate device 16. The vehicle 70 may include various types of vehicles including an automobile, a ship, a bus, a train, an airplane or the like. The intermediate device 16' is coupled to one or more antennas 50' that may be located on the exterior of the vehicle. Of course, the antennas 50' may be located within the vehicle 70 at the intermediate device 16'. A user device 80 is in communication with the intermediate device 16. For convenience, a line representing either a wireless or wired connection is presented between the user device 80 and the intermediate device 16. The user device 80 requests content from the intermediate device 16 and, more particularly, from the content storage 60 of the intermediate device 16. A venue 81 such as a stadium, office building, hotel or multiple dwelling unit may have an intermediate device 16" with an exterior antenna 51 in communication with the antenna array 44 of the cell tower 42 and/or the antenna 48 of the TV tower.

The cell tower 42 may use LTE technology or other cellular technology. In particular, the cell tower 42 may use LTE-B technology to communicate with the intermediate device 16. A wired connection 82 may be disposed between the communication network 14 and the internet 18 and/or communication system provider 12. As will be described below, the intermediate device 16 may be part of the cell tower 42 and thus the antenna array 44 may act as a Wi-Fi or WiMAX antenna for communicating with the user devices.

The connection between the communication network 14 and the internet 18 or the communication system provider 12 may also include remnant capacity. This remnant capacity may be utilized by the system in a similar way as the afore described remnant capacity, to distribute pre-positioned content to the communication network 14 or to the internet 18, for their in-turn distribution of the pre-positioned content, including using remnant capacity, to ultimately reach the intermediate device 16.

Figure 1B:
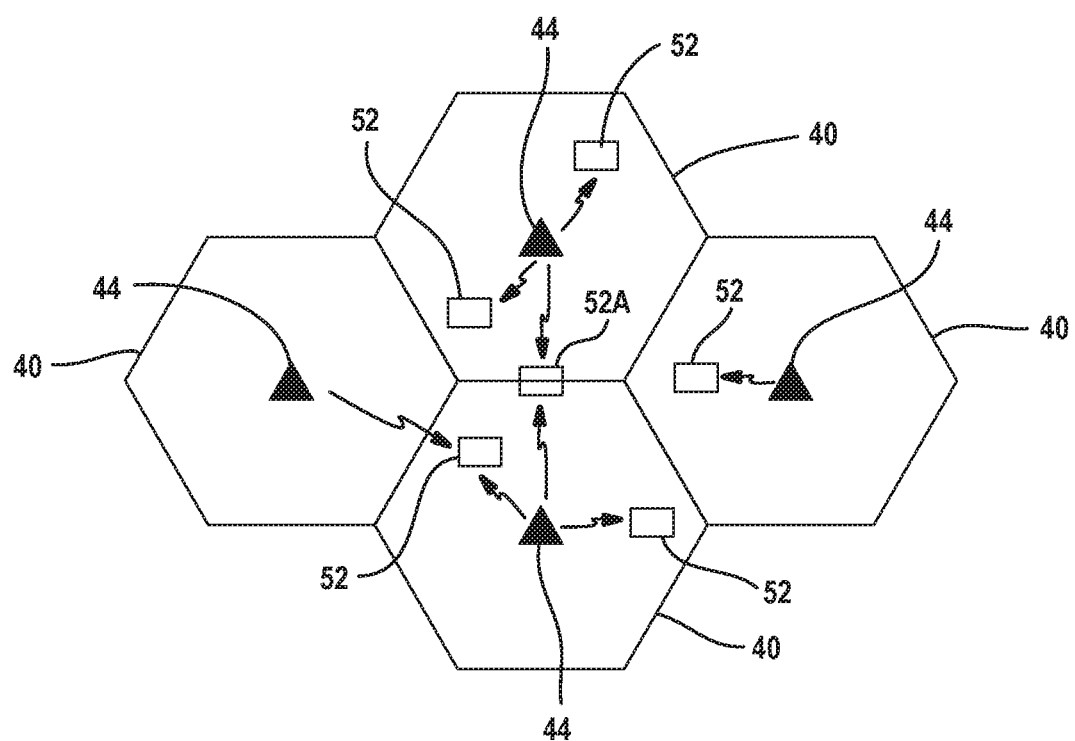
FIG. 1B is a block diagrammatic view of a cell system with multiple antennas.

Referring now to FIG. 1B, a plurality of antenna array 44 are illustrated within respective cells 40. The antenna array 44 may have a triangular shape. Although, different shapes and configurations of antennas of may be used. A plurality of terminals 52 are illustrated. The terminals 52 may be referred to as user terminals or user devices and may encompass the intermediate devices 16, the user device 80 and the venue 81 illustrated in FIG. 1A. The terminals 52 may be fixed terminals meaning they generally do not move while in operation or mobile terminals such as cellular phones, mobile computers or vehicles. As will be described in further detail below, at least one of the terminals 52A may be disposed at or near a boundary of an adjacent cell. The terminal 52A, as will be described below, may be serviced by more than one antenna array 44.

Figure 1C:
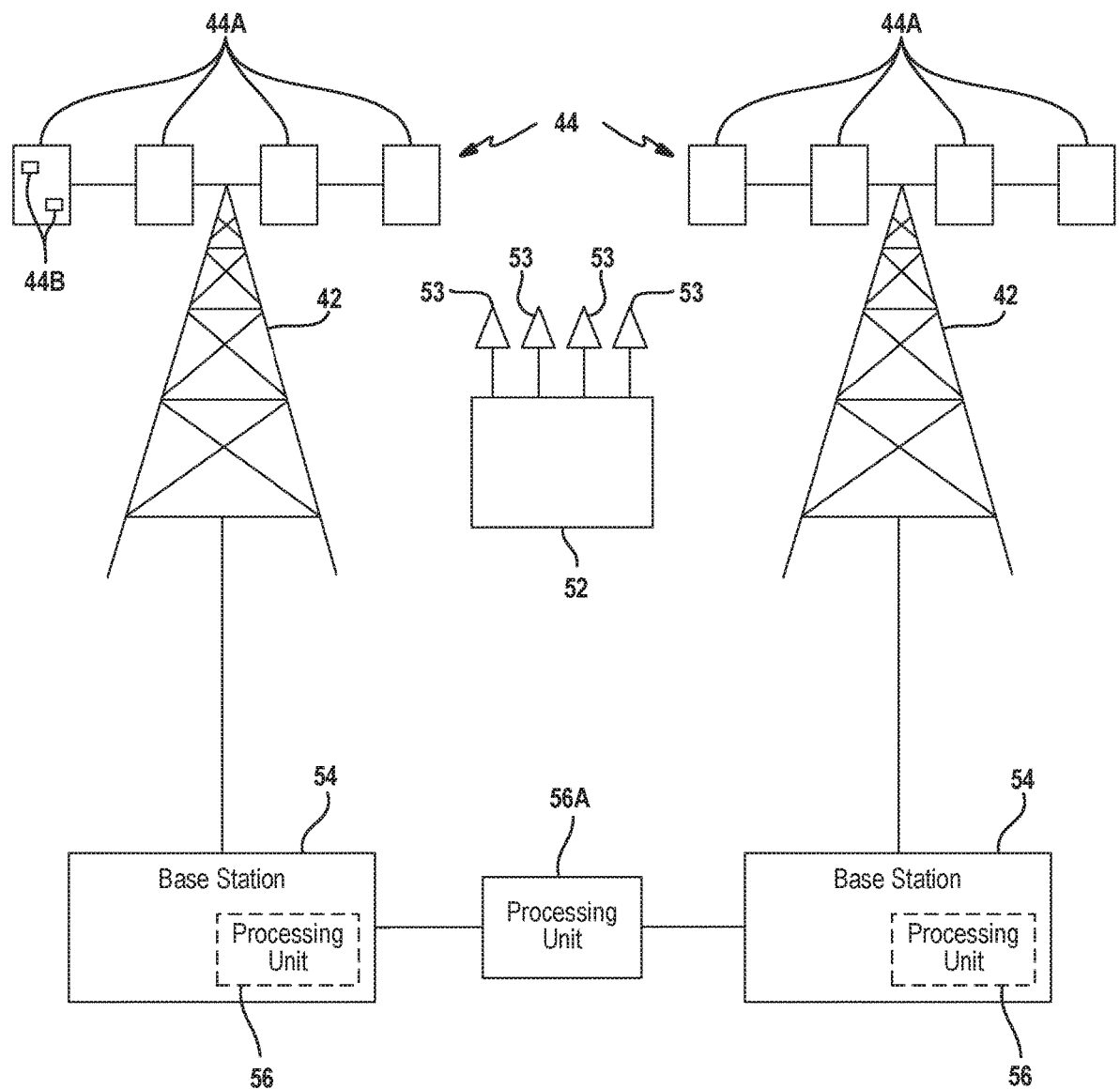
FIG. 1C is a block diagrammatic view of a pair of cell systems with a user terminal therebetween.

Referring now to FIG. 1C, a pair of cell towers 42 in adjacent cells 40 (illustrated in FIG. 1B) are set forth. The antennas 44 have multiple antenna elements 44A, each of which have multiple antenna elements 44B. The antenna elements 44B may be controlled to direct a beam in a desired direction. The elements 44B may be used to form a transmitting beam and a receiving beam.

One example of a terminal 52 is illustrated in FIG. 1C. The terminal 52 may also have multiple antenna portions 53. The antenna portions 53 may comprise a plurality of transmitting elements and a plurality of receiving elements. In this element, two of the antenna portions 53 may be transmitting elements while two other antenna portions 53 may be receiving elements. Each cell tower 42 may be associated with a basestation 54. The basestation 54 controls the operation of the transmit and receive functions of the antenna elements 44A. A processing unit 56 may also be associated with each basestation 54. The processing unit 56 may intercommunicate to allow coordinate control of the beams generated from the cell towers 42 and the antennas 44 thereof. Although one processing unit 56 may be disposed within each basestation 54, a centrally located processing unit 56A may service multiple basestations and perform the calculations thereof.

Figure 2:
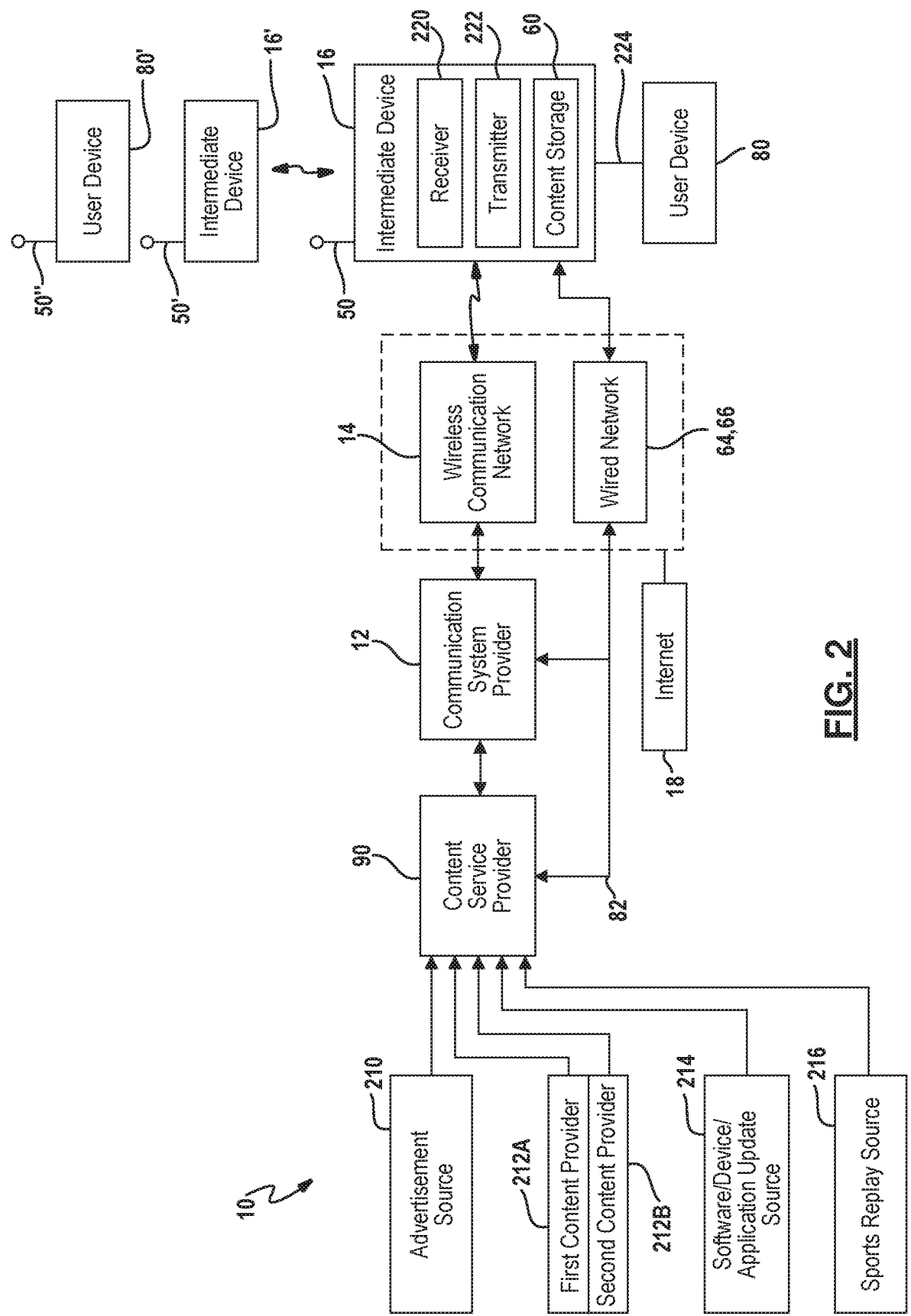
FIG. 2 is block diagrammatic view of a more detailed view of the communication system of FIG. 1.

Referring now to FIG. 2, the communication system provider 12 is shown in communication with a content service provider 90. The content service provider 90 is a system that is used for providing content to the communication system provider 12. The content service provider 90 and the communication system provider 12 may be business entities. The content service provider 90 may purchase the remnant capacity of the communication system provider 12. The content service provider 90 may be a service provider that is subscribed to by the users of the user device 80. However, the content service provider 90 may include pre-existing services such as mobile phone service providers, cable providers and the like. The content service provider 90 communicates various instructions to the communication system provider 12 so that the content is distributed, for example, by using the remnant capacity of the communication system provider 12. Details of the intercommunication between these systems are described in further detail below.

The content service provider 90 may receive content from various sources including an advertisement source 210, a first content provider 212A, a second content provider 212B such as a content owner, a software/device/application update source 214 and a sport replay source 216. The advertisement source 210 may communicate advertisements to the content service provider 90. The advertisements may include video, audio and metadata associated therewith. The metadata associated with an advertisement may include desired targets or which users would find the content desirable and a product definition.

The content providers 212A and 212B may also provide video and audio content as well as metadata for the content. The metadata may include the content title, actors or actresses, and various other identifying data including various categories such as genres and the like. The content may be requested from the content providers or indicated to be pre-positioned at the intermediate devices by the content providers.

The software/device/application update source 214 may provide new software, software updates, device updates and user application updates to the intermediate device 16 through the content service provider 90 and the communication system provider 12, intended for the user device. The updates may be incremental changes to software resident in a user device, whereas the new software may be software not currently within the user device or intermediate device 16. The software and updates may be requested by a device for non-real-time delivery or delivered through no action of the device and pre-positioned at the intermediate device based on the identity of the user device, the software or the user applications residing thereon.

The sports replay source 216 may provide sports replays to the content service provider 90 for distribution to the intermediate device 16. The sports replay content may be short video clips of certain special or important events of a game or match. Sports replays may be clips that include both audio and video content. The sports replay may also include metadata that identifies the team, the players involved, the sport, the clip or replay display title and the like. The clip display title is what may be displayed to a user in a user interface.

The metadata included with the various types of content described above allows the content to be distributed to the proper intermediate device or intermediate devices on the right schedule while accommodating any other content distribution priorities while using the remnant capacity of the communication network under the control of the communication system provider 12.

The intermediate device 16 is illustrated having content storage 60 and also a receiver 220. The receiver 220 may be used to receive communications from the wireless communication network 14. A transmitter 222 may be used to transmit wirelessly or by wire to and from the wireless communication network 14, the wired network 64 and/or the wired network 66.

The user device 80 is illustrated having a direct or wired connection 224 with the intermediate device 16. The intermediate device 16 may thus be a dongle or other type of directly connected device to the user device 80. The wired connection 224 may be an HDMI or USB connection.

More than one intermediate device may be disposed in a system. The intermediate device 16 may also communicate with a second intermediate device 16'. The intermediate device 16' may be configured in the same manner as that of the intermediate device 16. The intermediate device 16 may communicate from the antenna 50 to the antenna 50' of the intermediate device 16'. The intermediate devices 16, 16' may form a peer-to-peer network which is described in more detail below. Of course, more than two intermediate devices may form a peer-to-peer network. The peer-to-peer network may communicate various types of content therebetween. That is, if one intermediate device misses a portion of a content transmitted from the wireless communication network 14, another intermediate device may be queried to determine whether the intermediate device includes the missing content. The missing content may thus be communicated in a peer-to-peer basis between the antennas 50 and 50'. The wireless communication network 14 may also distribute various portions of the content which are then communicated to various other intermediate devices in an intentional way rather than a "missing" way. If content is desired by the user of one intermediate device but is not available at that intermediate device, the intermediate device for the intentional request may request the content from another intermediate device within the peer-to-peer network. Further, some the intermediate devices 16' may be configured to not have an ability to receive content from wireless communication network 14, and be only able to communicate with other intermediate devices 16 and 16' to receive the "intentional" or "missing" content.

The intermediate device 16' may be in communication with a user device 80'. The user device 80' may be in communication with the intermediate device 16' through the antenna 50". The user device 80' may be configured in a similar manner to that set forth at the user device 80' but may be a wireless device rather than a wired connection as is illustrated with respect to the user device 80.

Figure 3:
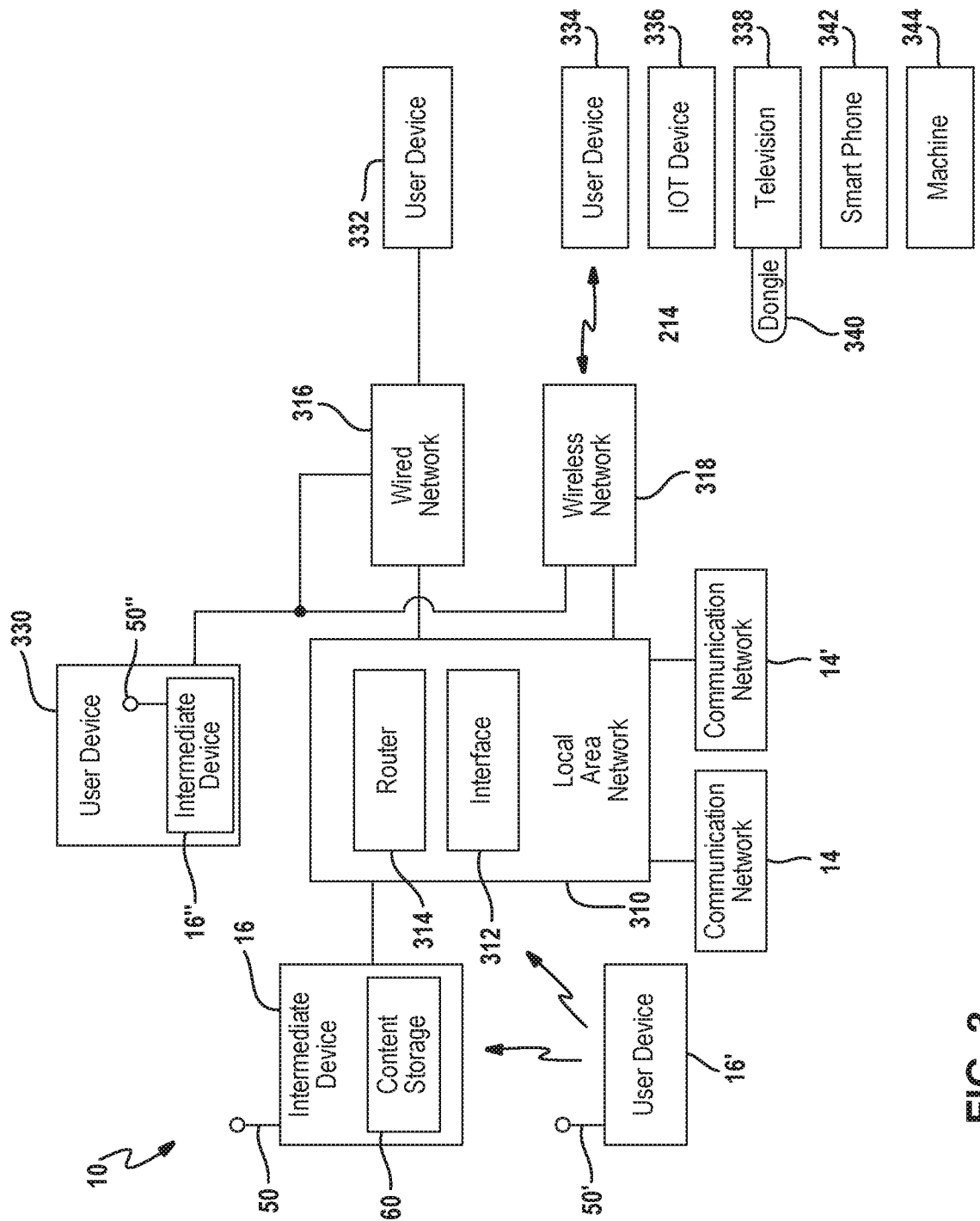
FIG. 3 is block diagrammatic view of a plurality of user devices in a local area network.

Referring now to FIG. 3, the communication system provider 12 may be in communication with a local area network 310 through the communication network 14 as described above. Only the communication network 14 is illustrated for simplicity. FIGS. 1 and 2 do not illustrate the local area network 310. The local area network 310 may have an interface 312 for communicating with the communication network 14. The interface 312 may be a modem.

The local area network 310 may also be coupled to a second communication network 14'. The second network 14' may be the primary two way connection to the Internet for the user devices 332-344. The second network 14' may represent dial-up or a digital subscriber line. As described in the examples set forth herein, the system 10 may be used to preposition content in the intermediate device 16. The supplementation of content is particularly useful when the second communication network 14' for providing regular internet service to user devices 332-344 is slower than the speed of the communication network 14, although not necessarily. It is possible that the local area network 310 may not have a two way connection to the internet except the prepositioned content received through the communication system.

The local area network 310 may also include a router 314. The router 314 may be used for connecting the intermediate devices with user devices within the local area network 310. The local area network may provide both a wired network 316 and a wireless network 318. Various devices may take advantage of each method of communicating.

The local area network 310 is in communication with one or more intermediate devices 16 as described above. The local area network 310 may also include an intermediate device 16, along with an interface 312, and a router 314. The local area network 310 may also include a user device 332, along with an intermediate device 16, interface 312, and a router 314. The intermediate device 16 includes the content storage 60 and the antenna 50 as described in FIGS. 1A-C and 2. The intermediate device 16' is in communication with the local area network 310 and may exchange content or other signals with the intermediate device 16 through the local area network 310. An intermediate device 16" may also be located within a user device 330. The user device 330 or the intermediate device 16" therein may include an antenna 50" for communicating with the local area network 310. The intermediate device 16" may receive content using the remnant capacity of the communication network 14. The user device 330 may be one of a variety of types of devices including a video game console, a cellular phone, a set top box or the like.

The user device 330 may be coupled to the local area network 310 through either the wired network 316 or the wireless network 318.

A user device 332 may be coupled to the local area network 310 through a wired network 316. The user device 334 may be coupled to the local area network 310 through a wireless network 318. As mentioned above, the user devices 332, 334 may be various types of user devices including a cellular phone or smartphone, a tablet, a laptop, a TV or the like.

An internet of things (IoT) device 336 may be coupled to the local area network 310 through the wireless or wired networks 316, 318. The IoT devices 336 may require software and user application updates suitably delivered via remnant capacity.

A television 338 may also be coupled to the local area network 310 through the wired network 316 or the wireless network 318. The television 338 may be a smart television for directly coupling to the wired network 316 or the wireless network 318. However, the television 338 may also require a dongle 340 that is used for communication with the wireless network 318. The dongle 340 may have a user application therein for providing the television 338 with a graphical user interface. The dongle 340 may also include a content storage for storing content therein. The dongle 340 may also act as an intermediate device for receiving and storing content.

A smartphone 342 may also be in communication with the wired network 316 and the wireless network 318 so that access to the local area network 310 may be obtained.

A machine 344 may also be in communication with the local area network 310 through the wired network 316 or the wireless network 318.

All of the user devices 330-344 may be in communication with the wireless network 318 using many different types of standards including Bluetooth and Wi-Fi. Each of the user devices 330-344 may receive content through the local area network 310 from at least one of the intermediate devices 16, 16' and 16". The user application for retrieving and serving content to the user devices 330-344 may be in the devices 330-344, in the intermediate device 16, in the local area network 310, in the router 314 or in the interface 312.

The types of content may include audio content, video content, operating system updates, other software updates, user applications, weather information, "best of web" content and e-delivery of various materials. The users of the user devices 330-344 may each obtain the various types of content from the content storage 60 of the intermediate device 16. The content may be obtained individually or simultaneously from the content storage 60. As will be described below, the user devices 330-344 may provide an inventory list or a list of desired content that is communicated through the local area network 310 and ultimately back to the communication system provider 12 of content service provider 90 illustrated in FIGS. 1 and 2. The communication back may be performed with either the communication network 14 or 14'.

Figure 4:
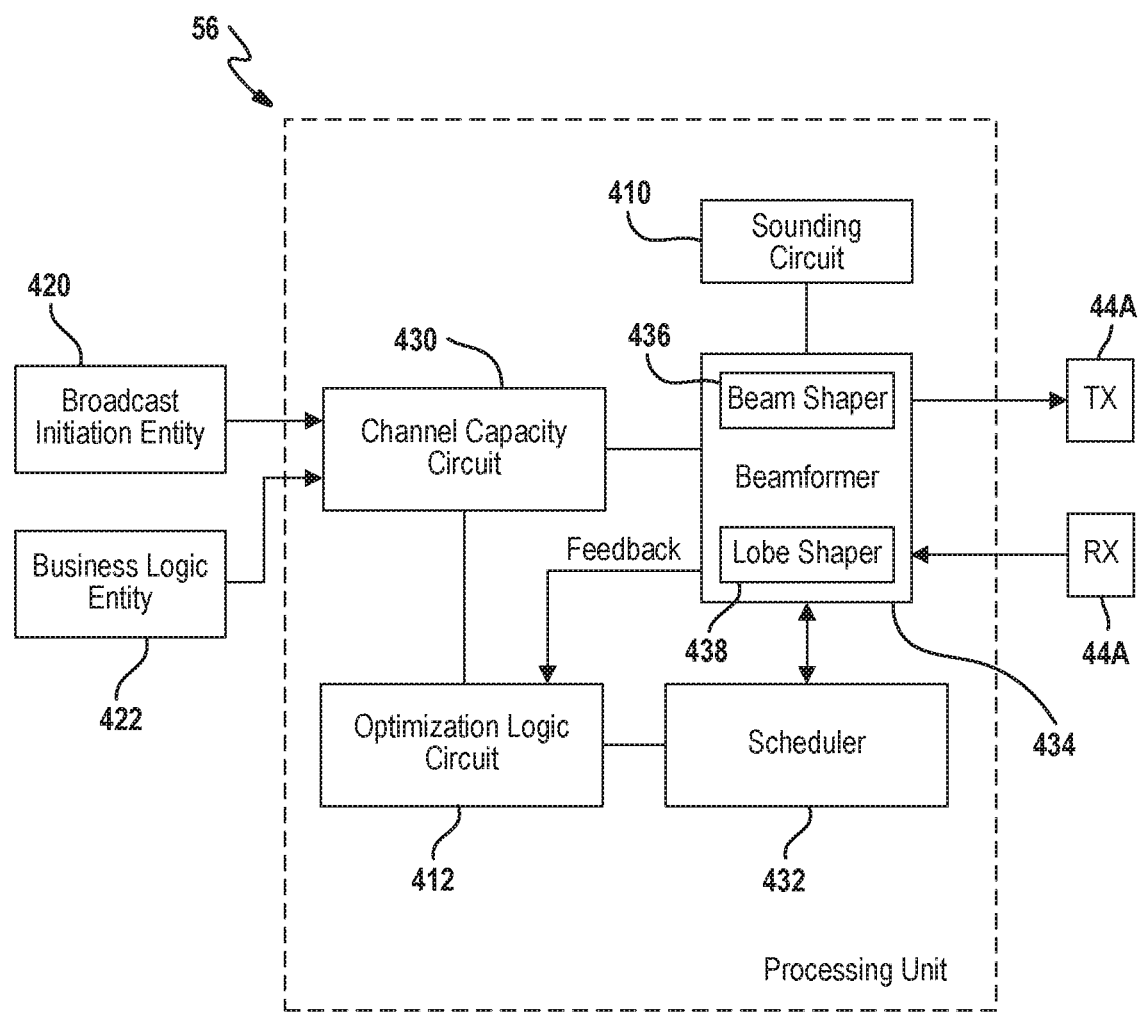
FIG. 4 is a high level block diagrammatic view of a processing unit.

Referring now to FIG. 4, the processing unit 56 set forth above is illustrated in further detail. The specifics of how the weights are computed later on. The processing unit 56 includes a sounding circuit 410 which is used to generate a sounding signal that is communicated to the devices within range of the cell tower and the antenna array 44 associated therewith. A response signal is received from the receiving elements of the antenna. Ultimately, feedback is communicated to an optimization logic circuit 412. The response signals from the terminals to basestation may be utilized for selecting unicast mode communication and broadcast mode communication. The feedback mechanism essentially "sounds the channel" by having receiving antenna elements 44A receive response signals from the terminals or devices as to their exact RF channel state (signal performance) with regard to each transmitting antenna. In the case of Massive MIMO, many antenna elements are used within one antenna system, each polarized, phased, and directed to create some level of orthogonality to one another, in which case their signal performance is detected at the receiving device for each the antenna element transmission, and the "channel can be sounded" for each the transmission flow.

The channel sounding feedback response signal includes channel state information or data, i.e. signal strength (amplitude) and phase information received from each transmitter antenna element, as seen by each receiver antenna element 44A. Essentially this is a matrix characterizing channel state between each transmitter antenna element and each receiver antenna element.

By sending this feedback back to a processing unit 56A, the processing unit 56, when collecting all the feedback on each of the transmission flows for each antenna element above, identifies an improved signal amplification and signal null steering for each antenna element, to produce an optimized transmission flow using the collection of antenna elements for each receiving device. In this case a broadcast beam may optimize a transmission using many antenna elements of a transmitter to optimally reach the many broadcast receiving devices, and in turn the many of their antenna elements, given their respective RF channel states with regard to each of the transmitting antenna elements.

The broadcast beam may consist of multiple sub-beams or lobes, each shaped to optimize transmission towards an identified clump or sub-group of devices within a group of devices or terminals needing to receive identified content. The clump or subgroup are geographically located within a predetermined distance of each other. The system uses a set of antenna elements 44A and applies the appropriate weights to them, to shape their transmission towards that clump of devices. Another similar subset of antenna elements may be optimized to create and direct another beam towards another set of devices elsewhere in the cell. This process may be carried out many times over, until exhausting the available channel capacity.

The feedback system enables the network to continually refine the shape of the broadcast beam, by adjusting/tuning the weights assigned to different spatial paths. This is especially important for mobile devices. The beam may be continually reshaped and optimized as the underlying devices move around, identifying at any given point where the critical masses of devices are, and continually using sounding mechanisms to optimally deliver energy where the needs are. For more stationary devices, the feedback system leads to convergence, in terms of arriving at a stable set of weights that shape the beam towards a clump of devices. In a fixed system as stationary devices are added the beam pattern is adjusted based on feedback from the newly added device. In addition to channel state, the feedback system may also include information from individual devices on reception quality, e.g. error rates, received throughputs. The network may factor in these inputs into its algorithm to: (a) refine its selection of candidate devices that form the broadcast group; and (b) to refine the shaping of the beam for better results. Further, the network factors in these inputs into its algorithm to decide how many beams/lobes are optimal to serve the candidate devices with the highest throughput while achieving the maximum coverage possible, some of which is defined further below. This results in a "breathing" system that continually adjusts parameters to optimize results.

Additionally, the processing unit 56 determines how many of the users are optimal to serve with a broadcast beam in order to optimize against certain criteria. For instance, one criterion may be to optimize total throughput in a given coverage area irrespective of how many users are served. For example, broadcasting at a higher (more optimized) modulation and coding rate (MCS), which is twice an alternative rate, but to reach only 20% of the total users covered by the transmitting antenna, may be inferior to transmitting at an alternative (lower) MCS but reaching 80% of the users covered by the transmitting antenna, as that creates a 2× disadvantage relative to the alternative broadcast beam approach. The factors are design criteria to be used by the system operators to balance coverage and throughput and thereby include or excel users/user devices accordingly.

In addition, geo-spatial re-use may be achieved by leveraging broadcast beams. An alternative scenario is one in which even if only ⅕th of the users may be served by a broadcast beam, it is possible to create two more broadcast beams (or lobes to the same first broadcast beam) in the same coverage area, to each serve their users at twice an alternative rate. Compared to the alternative rate, where it was not possible to create any more beams to serve the 80% of users covered, this would actually allow 50% more throughput to be achieved through the three beams, each transmitting at twice the alternative rate, even though each covering only ¼th of the users otherwise covered by the alternative rate transmission, i.e. 2×3×ij=1.5 times the capacity of the alternative scheme. The present examples builds multiple narrowly focused beams, that cover smaller portions of the device population, but are able to provide a higher data rate to those sets of devices. The method here would involve: identifying a set of devices that are in good radio conditions and excluding other devices based on the radio conditions, focusing a beam towards them that enhances their link (signal strength/SINR), and enable them to demodulate effectively at a higher modulation and coding rate. The radio conditions are data about, but not limited to, a device location, a signal strength of the sounding signal and phase information of the sounding signal, modulation and coding scheme and overlap with adjacent beams.

Another criterion may be simply to optimize coverage in a given area, i.e. maximize the number of devices that may be covered by the broadcast beam. A third approach may be to use a weighted scheme, taking into consideration capacity and coverage in a holistic (weighted fashion).

Further, the system may use the feedback to enable the system to make decisions on use of broadcast vs. unicast approaches, in combination as permitted or in sequence, in each case to achieve an improved throughput across the coverage area all given the channel state/path information with regard to each receiving device in relation to each antenna element of the transmitting device. The system identifies "challenged" terminals (i.e. the ones whose radio conditions are challenged and which may not be best served by a broadcast, dragging down the throughput rate of the broadcast and that to each of the other more advantaged users) and not waste precious optimized modulation rate to "reach those challenged users" and instead aim to serve the more well positioned users using broadcast, and the more challenged users using unicast. For example, the system may also use the feedback to create one or more broadcast beams to serve 80% of the users, and choose to serve the other 20% of the users using unicast Massive MIMO beams in parallel, further optimizing coverage area throughput.

This proportion of broadcast mode to unicast mode may also be managed to optimize for capacity (system throughput) or coverage. Such a decision would determine the broadcast/unicast "cutoff", i.e. the coverage threshold (e.g. signal strength, SINK) below which a device's link is deemed to be too weak for the device to be included in the broadcast group. In essence, this becomes a linear optimization problem—optimizing the mix of number of devices included in the group vis-a-vis the modulation and coding scheme (MCS) that may be applied to transmissions to the group (the MCS, in turn, directly influences the data rate). The decision would revolve around whether to choose a smaller broadcast group of devices with much better radio conditions (enabled for higher throughput), and delegate the other devices to unicast, vs. choosing a larger broadcast group with a lower SNR/signal strength cutoff, enabled to receive lower throughput. The linear optimization would attempt to arrive at the right mix that produced the highest throughput and spectral efficiency. Essentially determining the following:

a. Whether creating a smaller broadcast group of devices in high-fidelity conditions (receiving a higher MCS, higher throughput) maximizes system throughput. Higher MCS use translates to higher spectral efficiency. And leaving the larger unserved group of devices to be served using massive MIMO unicast, without the advantages of broadcast by way of how many users may be served with the same transmission, but gaining the advantage of how high through put the broadcast is, and how efficient massive MIMO is in serving challenged users with relatively higher throughput.

b. Whether a larger broadcast group of devices, some in slightly weaker radio conditions (i.e. having a lower cut-off) produce a higher throughput product. Keeping in mind that broadcast delivers higher overall spectral efficiency, since the same set of radio resources is being used to serve a large number of users. Here, the higher throughput per user would be sacrificed to serve more users and achieve a higher throughput potentially for broadcast. However, even if the result lead to a lower total throughput by broadcast than in the smaller broadcast coverage zone, but allowed unicast to serve the users unserved by broadcast more effectively, since there were fewer of them remaining, it may still lead to a higher overall throughput across a given total wireless coverage area. Hence, a larger broadcast/unicast split would increase spectral efficiency.

Within the wireless system, radio resource management (RRM) and scheduling are key components that coordinate the usage of precious radio resources. In 2G, 3G, 4G or 5G systems, for example, these components allocate radio resource blocks to devices, in scheduled time slots, for both unicast and broadcast services. These radio resource allocations provide devices with transmit and receive opportunities, i.e. timeframes and radio bandwidth to send and receive data. The broadcast beam formation component needs to interact with radio resource management and scheduling components. Decisions made as part of broadcast beam formation, with respect to device selection/culling for a broadcast group, are closely interlinked to MCS selection and allocation of radio resource blocks. For example, to optimize for coverage, the broadcast beam might include devices in its broadcast group that exhibit signal strengths above a low enough threshold. This signal strength/SNR cutoff maps to a lower MCS level to be used for the broadcast. The lower MCS level chosen, in turn, may dictate a larger number and frequency of radio resource blocks to be allocated to the broadcast (using a lower MCS level across the board (fewer bits per symbol) means more radio blocks needing to be allocated to achieve a given data rate).

If, on the other hand, the decision is to optimize for capacity, the system may employ a higher signal strength/ SNR cutoff, to include a smaller set of devices with higher radio fidelity in the broadcast group. This, in turn, maps to the use of a higher MCS level for the broadcast, which may dictate the use of a smaller number of radio resource blocks to achieve a given data rate. In this case, it is evident that not only is the trade-off in how much throughput vs. coverage a given broadcast beam may achieve, and by virtue of that the entire broadcast and unicast composing system, but the amount of radio resources allocated for the broadcast beam to achieve its contemplated trade-off. In this case, multiple broadcast beams may be contracted to create an underlay and overlay of broadcast beams, each covering a different proportion of the coverage population with a different throughput (MCS) rate, in order to optimize the total throughput vs. coverage area by broadcast. This of course could further be optimized by factoring in unicast service availability to address the complete totality of throughput vs coverage requirements in a given area.

A similar scenario may be driven by the quantum of available radio resources. If the radio network has a limited number of radio resource blocks available, this may dictate the use of a high enough MCS (bits per symbol) to achieve the required broadcast data rate. This would, in turn, trigger the use of a higher signal strength/SNR cutoff, and hence, a smaller set of devices being included in the broadcast group.

In this way, the key system parameters involved—number of devices to be included in the broadcast group (accordingly, the number of and selection of devices to be culled), signal strength/SNR cutoff, MCS selection and radio resource allocation/scheduling, are all closely interlinked to one another. These decisions need to be coordinated by the scheduler 432. These parts of the technology, therefore, need to evolve to support the beam formation system described here.

Broadcast functionality, as defined in 4G systems, includes the concept of Multimedia Broadcast Single Frequency Network (MBSFN). MBSFN refers to the simultaneous transmission of identical broadcast streams from multiple time-synchronized cells using the same radio channel. The synchronized multi-cell transmissions are received and combined by a device to achieve higher signal-noise ratio (SNR), especially for cell edge devices that may hear transmissions from multiple cells. MBSFN, therefore, extends broadcast into a multi-cell transmission paradigm, enabling a larger number of devices to receive a broadcast with good quality.

Broadcast beam formation and MBSFN may combine to provide underserved devices with better radio conditions than might be possible with either technology individually. Broadcast beam formation may factor in devices, not just in the cell forming the beam, but cell-edge devices in neighboring cells. The beam may be shaped to include some of the devices in neighboring cells. Devices in a cell that are not included in a broadcast beam emanated by that cell could benefit from a beam shaped by a neighboring cell. This may improve radio conditions of weaker devices, which may now be safely included in a high-MCS broadcast (i.e. may reliably demodulate signals transmitted at a high MCS even though the devices' coverage from their home cell is lower than needed to demodulate the signal reliably). A device that might otherwise have to be culled from a high-MCS broadcast could now be included, since the device may combine signals from multiple neighboring cells, and/or leverage a beam from a neighboring cell, to be able to reliably decode the signal. In this manner, a larger number of devices may be included in a broadcast (greater coverage), without sacrificing system capacity.

Broadcast beam formation benefits from the use of larger numbers of basestation antenna elements. A larger number of antennas enables a larger number of spatial paths to be exploited, and improves overall performance of the beamformer 434. There is an improved gain between each transmitter and receiver/receiver clump, from increased signal diversity to utilize to amplify the best paths and null out the worst, when more paths become available. There is an opportunity to improve beam focus, improving signal strength and SNR at each receiver. The increased number of device antennas also provides a processing gain that causes SINR to increase linearly with the number of antennas. Hence, increasing the capacity logarithmically. In sum, a larger number of basestation and/or device antennas leads to improved beam forming performance and higher throughput achieved at each receiver, allows larger clumps of devices, and a larger number of clumps of devices, to be serviced by the beam and its lobes increasing the device population services at a given throughout rate, and overall leads to a higher area throughput and/or population coverage.

In FIG. 4, the processing unit 56 may be coupled to a broadcast initiation entity 420. The broadcast initiation entity 420 is used for starting a broadcast session. The broadcast session may use regular scheduled communicate resources or random resources as set forth above. The present example is provided with respect to various wireless technologies that may include but are not limited to LTE 4G, 5G, 3G, Wi-Fi and the like. In an LTE/4G system, the broadcast initiation entity may be a mobile management entity (MME) or a multi-cell, multi-cast coordination entity (MCE). The processing unit receives the starting or initiation signal for the broadcast starting. A business logic entity 422 also provides logic and policy requirements for communication of signals to the processing unit 56. The business logic entity 422 may be used for determining the logic or policy associated with broadcasting. The logic may determine how many and which devices to include in the broadcast group and whether capacity maximization or higher throughput is desired. For the individual processing units, the signals from the broadcast initiation entity 420 and the business logic entity 422 are used by a channel capacity circuit which determines the capacity for communicating new content to user devices or terminals. The channel capacity circuit 430 may take into consideration the use of remnant capacity as well.

The optimization logic circuit 412 ultimately determines how many and which devices to include in the broadcast group based upon the business logic and policy requirements. When coverage maximization is the desired goal, the optimization logic circuit 412 of the processing unit 56 may include most or all of the devices or terminals within an area. The optimization logic circuit 412 may remove devices from a broadcast group to repurpose them for unicast delivery. Ultimately, a scheduler 432 is provided with the number of devices, the average signal strength and the MCS to be applied to a broadcast. The scheduler 432 allocates radio resources such as resource blocks to the broadcast beam and based upon the input from the beamformer 434 schedules the broadcast and the unicast. The beamformer 434 has a beam shaper 436 and a lobe shaper 438 that adjusts the weights of the broadcast beams and the side lobes associated therewith to incorporate or encompass the group of devices within the broadcast. The beamformer 434 is also used to modify the shape of the broadcast beam to accommodate various clumps or subgroups of devices that are to be broadcasted to. The lobe shaper 438 is used to shape the side lobes to accommodate some of the clumps of the devices or terminals. Ultimately, the weights are used to adjust the elements of the transmitting antenna array 44 so that the broadcast beam is directed in the desired directions.

Figure 5:
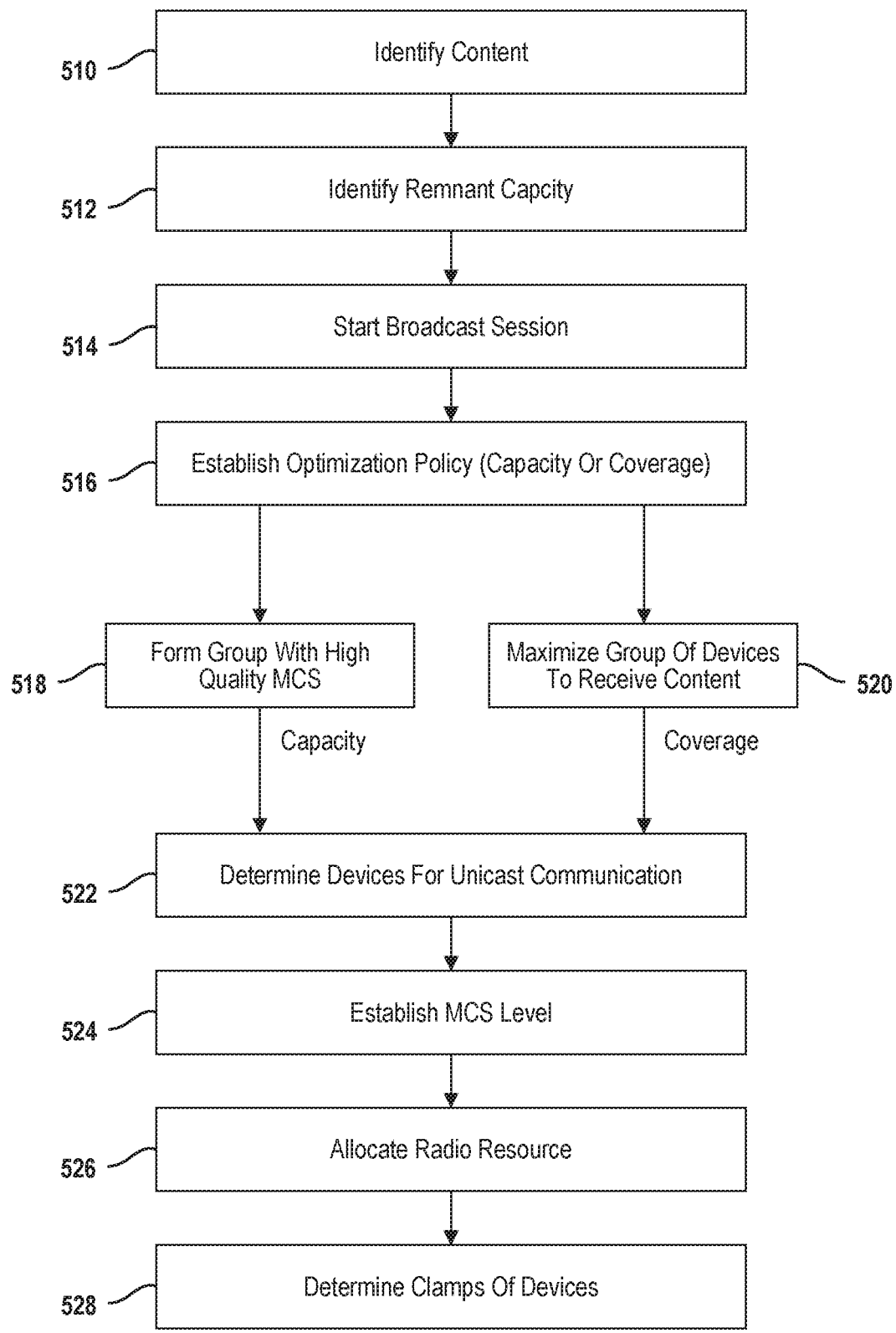
FIG. 5 is a flowchart of a method for starting a broadcast session.

Referring now to FIG. 5, the system identifies content to be provided to multiple user devices/terminals. When common content for multiple users is identified, the use of broadcasting resources makes sense in step 510. In step 512, the remnant capacity of the system may be identified. Although remnant capacity may be desired to be used for the system, the use of remnant capacity in step 512 is optional. The remnant capacity 512 as described above may be communicated to the processing unit so that the content identified to be broadcast may be scheduled. In step 514, a broadcast session is started. As mentioned above, the broadcasting session may be started by the processing unit 56 receiving a signal that corresponds to the start of a broadcast session from an external system. The broadcast initiation entity 420 such as a mobile management entity or a multicast coordination entity may provide such a signal.

In step 516, an optimization policy is established and communicated to the processing unit 56. The optimization policy may, for example, determine whether the capacity optimization or coverage optimization is desired. This step is a design consideration for various systems. It should be noted that the optimization policy may change depending upon the time period for which broadcasting is being considered. For example, the peak times may have a different optimization policy than the other times such as on different days or times of days. Weekend days or holidays may also factor into the selection of the optimization policy. If capacity is to be maximized in step 516, a group to receive a broadcast is formed with high quality modulation and coding rate (MCS). Referring back to step 516, when maximizing coverage is desired, step 520 maximizes the group of devices to receive content regardless of the quality. The maximizing of a group recognizes the drawback that some users may re-request a content. Once the group of broadcast devices is determined, in either step 518 or 520, step 522 determines the devices for unicast communication. That is, not all of the devices desiring the content may be included within a group. Some of the devices not within the group may be communicated to with a unicast signal generated by the cell tower. In step 524, the schedule establishes the MCS level for the broadcast. In step 526, the radio resources are allocated by the scheduler in step 526. In step 528, clumps of devices within the group of devices are determined so that the weights may be adjusted to optimize communication with the devices in the clumps. Both the primary beam and the side loads may be adjusted with the weights to communicate with the terminals and user devices.

Figure 6:
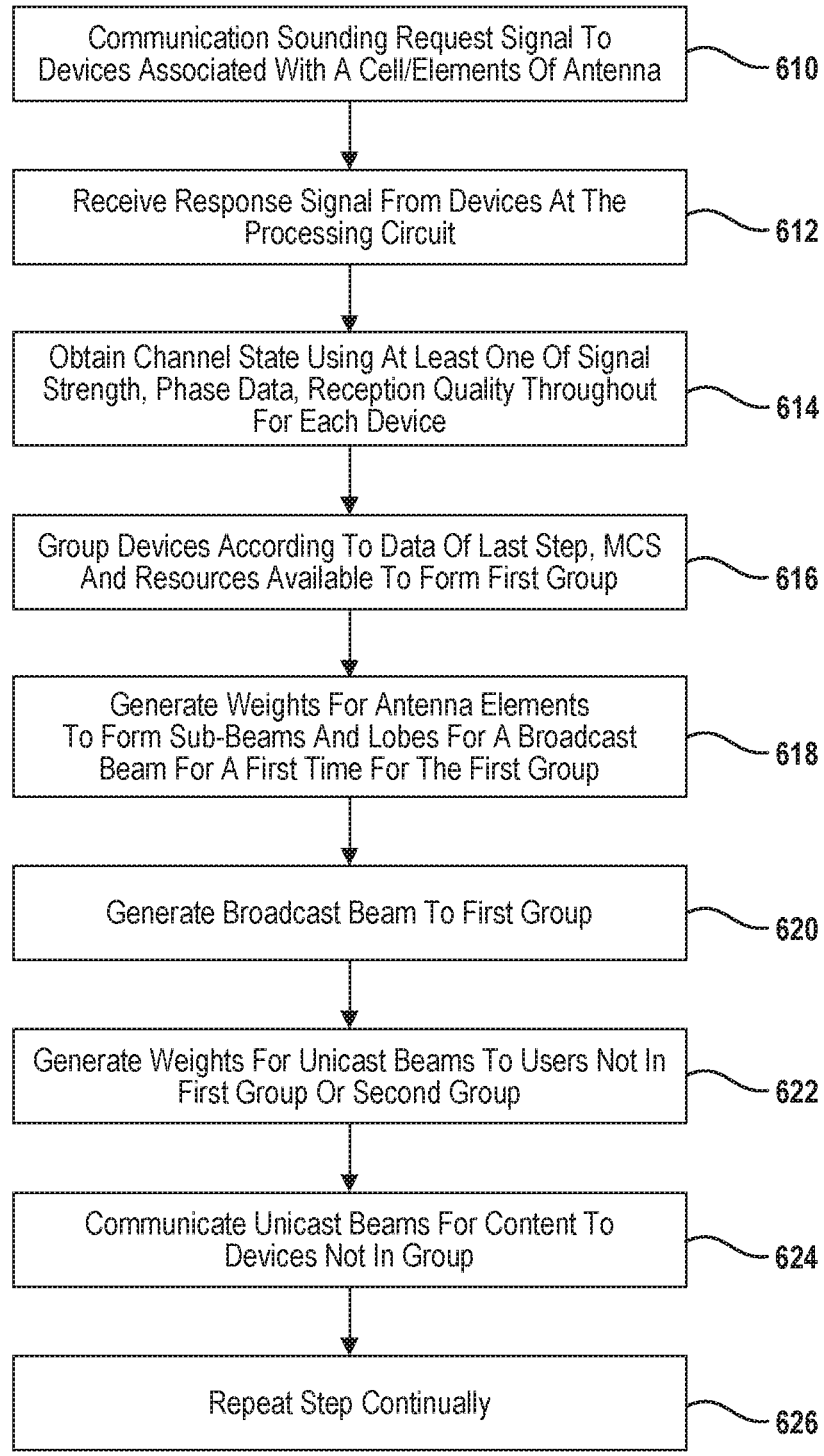
FIG. 6 is a flowchart of a method of forming and communicating with a group.

Referring now to FIG. 6, the operation of the system at various times interval. In step 610, a sounding request signal is communicated to the devices associated with a cell using the elements of the antenna array. All of the antennas within a cell may communicate a sounding signal so as to obtain requested data from the various devices and terminals within the range of the cell. This sounding signal may also be obtained from devices on the edge of a cell. The beamformer 434 sends out the sounding request which are ultimately used to identify the locations of, the paths to, and clumps of devices within the cell. Of course, the data provided may be different depending upon the type of wireless systems such as LTE, Wi-Fi or 5G. In step 612, a response signal is received from the devices at the processing circuit of the cell tower. The feedback may include channel data and may include the data such as complex channel gains, transmit beamformer 434 weights or aperture estimates and the like.

In step 614, a channel state for each terminal is determined. The channel state may use the signal strength, the phase data, the reception quality, the error rate and throughput for each device. In step 616, the devices are grouped according to one or more pieces of data from step 614. In step 618, weights for the antenna elements to form the sub-beams and side lobes may be performed. The weights may be determined for different broadcast groups as well as different clumps of groups within the broadcast group. As mentioned above, side lobes may also be incorporated within a broadcast group whereby primary beams and sub beams, such as side lobes, may also be created to optimally communicate the content. In step 620, the broadcast beam is generated for the first group should a second broadcast beam be desired. In step 622, weights for a unicasting may also be generated for users that are not within the first group or a second group. In step 624, the unicast beams are communicated to devices not in the first group. In step 626, the process may be continually performed. That is, the sounding from different user devices or terminals may be continuously performed particularly in systems in which mobile devices are used. One feedback element may be the velocity of the device and therefore, a prediction of movement of the device and therefore a modification of the shape of the output of the antenna and thus the beam may be performed. This is particularly important for devices moving at high speeds such as on a freeway. The ultimate position may change rapidly and therefore the beam may be adjusted to accommodate for the movement of the next communication.

Figure 7:
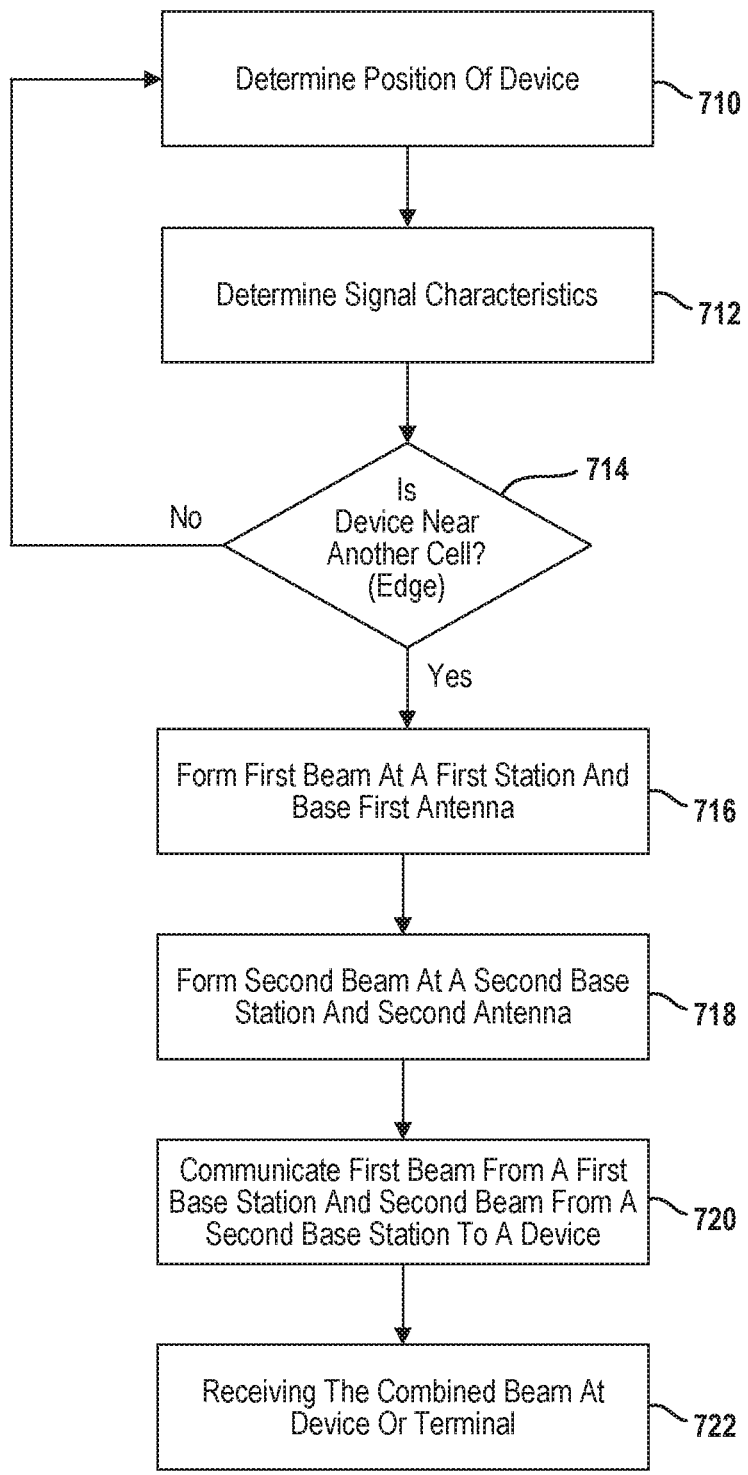
FIG. 7 is a flowchart of a method for operating with user terminals at the edge of a cell.

Referring now to FIG. 7, a method of communicating with devices that are at the edge of the cell is set forth. In step 710, the position of the devices is determined. As mentioned above, in step 614, the channel state for various devices may be performed using the sounding feedback and receiving a response signal from the various devices. The various devices within the cell and near the edges of adjacent cells may receive lower quality signals. The processing unit of adjacent cells may be determined in the communication and the overall system may be considered. That is, more than one cell may be used to communicate with devices at the edge of cell to increase the receipt signal. In step 712, the signal characteristics of the devices or terminal is determined. In step 714, it is determined whether the device is near the edge of the cell based upon the signal characteristics. In step 716, a first beam is formed at a first basestation with a first antenna array. In step 718, a second beam is formed at a second basestation with a second antenna array from an adjacent cell. In step 720, the first beam from the first antenna array of the basestation using the weights provided from the beamformer and a second antenna array second beam from a second basestation using the weights provided from the beamformer is communicated to one device (at the edge of two adjacent cells. The power output is shaped by the first beamforming weight vector used to communicate a data signal. In step 722, the combined signal is received at the device or terminal. This increases the likelihood that a useable signal is received so that the broadcast content may be used.

Figure 8:
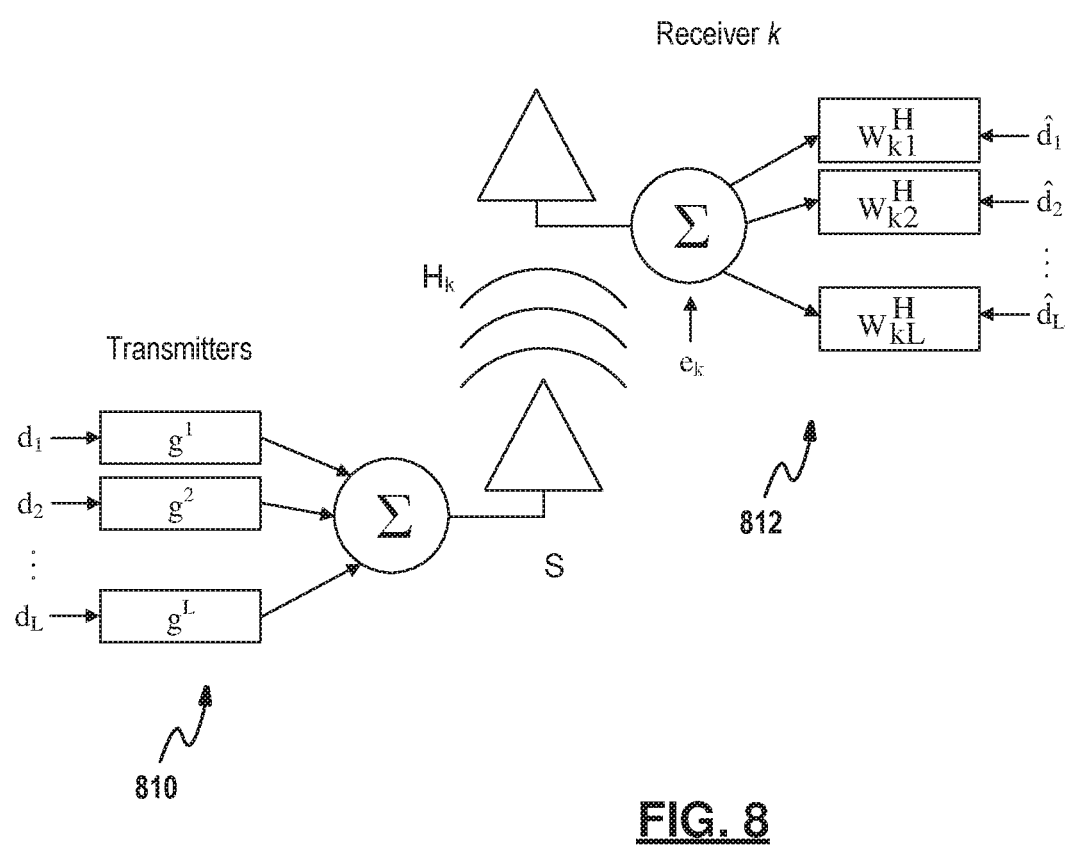
FIG. 8 is a block diagrammatic representation of a transmitter and a receiver.
Figure 9:
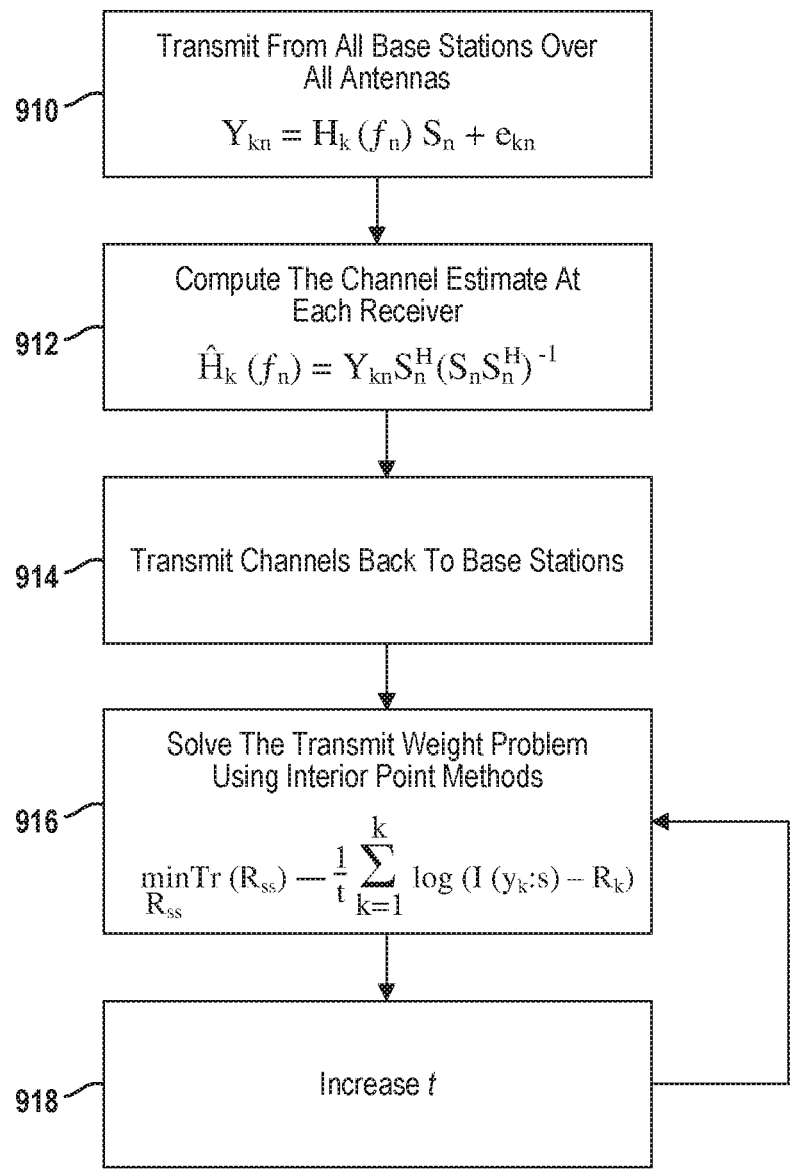
FIG. 9 is a flowchart of a method for computing weights using an interior point problem.

Referring now to FIGS. 8 and 9, the general broadcast channel considers the problem of transmitting a single source transmitter (S) 810 to multiple receivers 812. The source generally is used to exploit multiple transmitters if available. This may take several forms, including multiple transmit antennas at a single transmitter or multiple distributed transmitters, possibly reusing receivers who already have the broadcast data available. Multiple transmitters 810 transmit a broadcast signal to multiple intended receivers 812. The transmitters 810 share the same broadcast data, either through a connected backhaul, or from a prior transmission. Additionally each transmitter 810 and receiver 812 may deploy multiple antennas for both receive and transmit.

The transmission is performed over N multiple carrier frequencies $f_n$ to allow a multiple input-multiple output (MIMO) channel to be treated as a simple matrix multiply for each frequency, and is consistent with modern multi-carrier communication waveforms. In the following example there are Q transmitters each with $M_t$ antennas, and K receivers each with $M_r$ antennas.

Let $H^q(f_n)$ be the $M_r \times M_t$ MIMO channel matrix representing the channel between transmitter q and receiver k at frequency $f_n$. Let $s_{qn}$ be a $M_t \times 1$ symbol vector, transmitted from transmitter q at frequency $f_n$. In Equation (1) the transmit symbol vector from transmitter q, $s_{qn}$, is related to the complex received data vector at receiver k, $y_k$ $$y_{kn} = \Sigma_{q=1}^{Q} H_k^q(f_n) s_{qn} + e_{kn}, \quad (1)$$

where $e_{kn}$ is the receiver noise plus interference vector seen at the k'th receiver. The interference might include cooperative or non-cooperative out of cell, co-channel cellular signals.

In step 910, all basestation elements may be used for transmitting. The equation may thus be simplified into a single matrix equation at each receiver k, of the form, $$y_k = H_k s + e_k, \quad (2)$$

Here the aggregate matrices may be decomposed as $$S \equiv [s_1^T, s_2^T, \ldots, s_Q^T],$$

$$s_q \equiv [s_{q1}, s_{q2}, \ldots, s_{qN}]^T$$

$$y_k \equiv [y_{k1}^T, y_{k2}^T, \ldots, y_{kN}^T]^T,$$

and $$H_k \equiv [H_k^1, H_k^2, \cdots, H_k^Q],$$

$$H_k^q \equiv \begin{bmatrix} H_k^q(f_1) & 0 & \cdots & 0 \\ 0 & H_k^q(f_1) & 0 & \vdots \\ \vdots & 0 & \ddots & 0 \\ 0 & \cdots & 0 & H_k^q(f_N) \end{bmatrix}.$$

The Capacity Region of the general broadcast channel in Equation (2) has yet to be characterized. However, the noise and the source statistics are assumed to be complex Gaussian noise. In this case the mutual information may be written as, $$I(y_k; s) = \log_2(I + R_{e_k e_k}^{-1} H_k R_{ss} H_k^H) \quad (3)$$

It is desired to minimize transmit power subject to a set of capacity targets, determined by the quality of service levels provisioned for each receiver k. This problem is written as, $$\min_{R_{ss}} Tr(R_{ss}) \text{ s.t.:} \quad (4)$$

$$\forall k \; I(y_k; s) \geq R_k,$$

where $R_k$ is the minimum target bit rate desired for receiver k.

Equation (4) is a higher rank approximation to the problem that maximizes the mutual information of the (nondegraded) Gaussian broadcast channel. It itself is a relaxation of the constrained problem that deploys beamforming at the transmitter.

The channel capacity of the Gaussian other-user interference channel may be achieved by using linear beamforming at both the transmitter and receiver. A new metric may be deployed which decouples the mutual information into single input single output (SISO) independent channels.

The decoupled capacity metric may be defined by, $$D_k(w_k; G) \equiv \sum_{l=1}^{L} I(d_l; \hat{d}_{kl}) \qquad (5)$$

$$I(d_l; \hat{d}_{kl}) \equiv \log_2\left(1 + \frac{T_{ll}^k}{\sum_{m \neq l} T_{lm}^k + w_{kl}^H R_{e_k e_k} w_{kl}}\right) \qquad (6)$$

$$= \log_2\left(1 + \frac{T_{ll}^k}{w_{kl}^H R_{i_k i_{kl}} w_{kl}}\right), \qquad (7)$$

and where, $$T_{lm}^k \equiv |w_{kl}^H H_k g^m|^2 \qquad (8)$$

$$R_{i_k i_k} \equiv H_k \sum_{m \neq l} g^m g^{mH} H_k^H + R_{e_k e_k} \qquad (9)$$

$$s = \sum_{l=1}^{L} g^l d_l \qquad (10)$$

$$\hat{d}_{kl} \equiv w_{kl}^H y_k \qquad (11)$$

$$G \equiv [g^1, g^2, \cdots, g^L]. \qquad (12)$$

The number L is the maximum usable rank of the broadcast channel. Note that $$L \leq \min(M_r, M_t QN).$$

Associated with the decoupled capacity metric, is the decoupled broadcast channel optimization problem, $$\min_{R_{ss}} Tr(G^H G) \text{ s.t.:} \qquad (13)$$

$$\forall k \ D_k(w_k; G) \geq R_k.$$

The decoupled formulation uses linear weights at the basestations and at the receiver. Note that the basestation transmit weights linearly mix both spatial degrees of freedom and frequency degrees of freedom into a single weight vector, essentially qualifying as a form of space frequency adaptive processing. The weights also mix across cooperating transmit terminals, assuming that they may be processed jointly and coherently.

The decoupled broadcast channel is illustrated in FIG. 9. From the data processing inequality it is clear that the solution of Equation (13) is an upper bound to the solution of Equation (4). However it is not hard to show that the optimal linear transmit weights G and receive weights wk, in fact achieve the general solution to Equation (4) as well. This may be shown by using receiver weights $w_{kl}$ derived from the L principle eigenvectors of the matrix:

$$R_e^{-H} H G G^H H^H R_e.$$

For some examples it is necessary to learn the channel matrices used in Equations (4) and (13). Many wireless standards, such as LTE, have provisions for channel sounding and have dedicated resources for sending channel information back to the basestation, or for exploiting channel reciprocity in time division duplex (TDD) systems.

If on the other hand, reciprocity may be exploited and use the decoupled metric formulation of the broadcast channel, the channel is not estimated at all, but merely estimate the transmit and receive weights $g^l$ and $w_{kl}$. These may be estimated in a straightforward manner using minimum mean square error processing.

The performance of channel sounding depends in part on the orthogonality of the training sequences involved. Transmission from a group of basestations for channel sounding purposes, for frequency fn, at time t, takes the form of $$y_{kn}(t) = \sum_{q=1}^{Q} H_k^q(f_n) s_{qn}(t) + e_{kn}(t). \qquad (14)$$

In matrix terms this may be written as, $$y_{kn}(t) = \sum_{q=1}^{Q} H_k^q(f_n) s_{qn}(t) + e_{kn}(t).$$

In matrix terms this can be written as, $$Y_{kn} = H_k(f_n) S_n + e_{kn} \qquad (15)$$

where, $$H_k(f_n) \equiv [H_k^1(f_n), H_k^2(f_n), \cdots, H_k^Q(f_n)],$$

$$S_n \equiv \begin{bmatrix} s_{1n}(1), & s_{1n}(2), & \cdots & s_{1n}(T) \\ s_{2n}(1), & s_{2n}(2), & \cdots & s_{2n}(T) \\ \vdots & \vdots & \vdots & \vdots \\ s_{Qn}(1), & s_{Qn}(2), & \cdots & s_{Qn}(T) \end{bmatrix}$$

and where, $$e_{kn} \equiv [e_{kn}(1), e_{kn}(2), \ldots, e_{kn}(T)] \qquad (16)$$

and T is the number of time samples in the training block. From step 912, the channel estimate at each receiver may be set forth as a minimum mean square estimate (MMSE) for the channel as, $$\hat{H}_k(f_n) = Y_{kn} S_n^H (S_n S_n^H)^{-1} \qquad (17)$$

The estimate in Equation (17) may get good results without strict orthogonality, but does begin to suffer if $S^H$ is not full rank.

In the following there are options for optimizing the linear beamforming weights at the basestations and at the receivers. For the case where the remote units have a single antenna and linear transmit beamforming at the basestations, relaxation techniques and dual programming techniques may be used. In step 914 channel signals are transmitted back to the basestations.

The problem may also be solved directly using interior point methods, and a logarithmic barrier function to handle the constraints. Thus, the problem is now an unconstrained optimization problem of the form, $$\min_{R_{ss}} Tr(R_{ss}) - \frac{1}{t}\sum_{k=1}^{K} \log(I(y_k;s) - R_k). \quad (18)$$

This procedure is illustrated in FIG. 9. To obtain a tighter approximation to the inequality constraints, t is increased in step 918 and the unconstrained problem and is further optimized.

Figure 10:
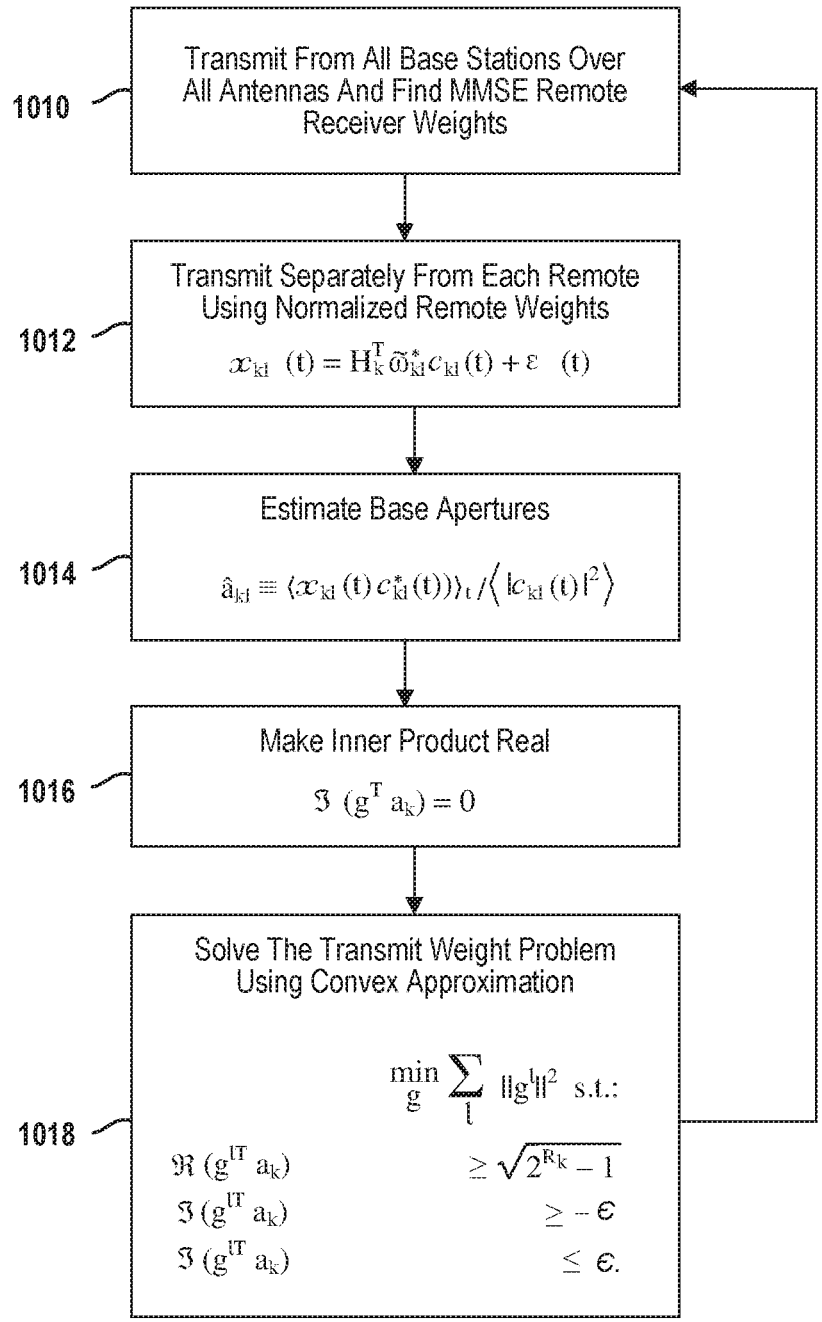
FIG. 10 is a flowchart of a method for computing weights from a decoupled problem.

Referring now to FIG. 10, a possibly more efficient way to obtain transmit and receive weights is to exploit channel reciprocity and use the decoupled capacity formulation. In this formulation the transmit weights are found by using an uplink or virtual uplink training sequence. The process requires solving a more complicated, NP-hard optimization problem.

In step 1010 a sounding signal is transmitted from all basestations over all the antennas to find minimum mean square error (MMSE) weights of the remote receiver. An uplink training opportunity for receiver k and MIMO index l is used. In step 1012, each remote antenna transmits normalized remote weights. Thus, the receiver model at the basestations take the form of, $$x_{kl}(t) = H_k^T \tilde{w}_{kl}^* c_l(t) + \varepsilon_{kl}(t) \quad (19),$$

where the interference normalized uplink transmit weights are given by, $$\tilde{w}_{kl}^* \equiv \frac{w_{kl}^*}{\sqrt{w_{kl}^H R_{i_{kl} i_{kl}} w_{kl}}}. \quad (20)$$

The interference covariance matrix may be estimated a number of ways, and in fact the quantity $w_{kl}^H R_{ii} w_{kl}$ may be estimated directly as well. If the weights $w_{kl}$ are determined using standard MMSE processing, the following approximation may be used, $$w_{kl}^H R_{i_{kl} i_{kl}} w_{kl} \approx \frac{w_{kl}^H R_{y_k y_k} w_{kl}}{1 + \gamma_{kl}}. \quad (20A)$$

Here, $\gamma_{kl}$ is the SINR at receiver k after applying $w_{kl}$, and $R_{y_k y_k}$ is the covariance seen by receiver k.

The receiver k to basestations aperture is defined by, $$a_{kl} = H_k^T \tilde{w}_{kl}^*. \quad (21)$$

In step 1014, the $_t$ aperture may be estimated at the basestation by MMSE processing as before, $$\hat{a}_{kl} \equiv (x_{kl}(t) c_{kl}^*(t)))_t / (|c_{kl}(t)|^2). \quad (22)$$

The normalized receiver weights easily unveils the reciprocal nature of the decoupled capacity constraints in that now, $$I(d_l; \hat{a}_{kl}) \equiv \log_2(1 + |g^{lT} H_k^T \tilde{w}_{kl}^*|^2) \quad (22A)$$
$$= \log_2(1 + |g^{lT} a_{kl}|^2)$$

Our objective function may now be written as, $$\min_{g^l} \sum_l \|g^l\|^2 \text{ s.t.:} \quad (23)$$
$$\forall k \sum_{l=1}^{L} \log_2(1 + |g^{lT} a_{kl}|^2) \geq R_k.$$

Of special interest is the case wherein a single mode is used, i.e., a single transmit vector at each basestation. This special case may almost be reduced to a convex programming problem.

First note that $g^{lT} H^T \tilde{w}_{kl}$ may easily be made to be real in step 1016 by simply altering the phase of the weights $w_{kl}$. The problem in step 1018 becomes, $$\min_g \Sigma_l \|g^l\|^2 \text{ s.t.:} \quad (24)$$
$$\Re(g^{lT} a_k) \geq \sqrt{2^{R_k} - 1}$$
$$\Im(g^{lT} a_k) \geq -\epsilon$$
$$\Im(g^{lT} a_k) \leq \epsilon.$$

The convex problem will be at the center of an iterative process that alters the phase of $a_k$ to make $g^T a_k$ real.

In FIG. 10, the decoupled problem requires an iteration over the weights at each remote and the weights at each basestation. However, the problem that has to be solved within each iteration is inherently simpler, with better convergence properties.

The following compares the performance of a broadcast channel in a sectorized cell, assuming full knowledge of the individual channel vectors from basestation to remote unit. A locally optimized beamformed solution is compared against a static isotropic beam.

The beamformer is a solution to the broadcast channel problem. The problem arises in multicast applications where a single stream of information needs to be shared among multiple transceivers. Unfortunately the problem is known to be NP hard. By contrast the isotropic beam case represents a theoretical naive implementation of a broadcast event, wherein the signal is simply broadcast over a uniform, spatially isotropic antenna or antenna beam.

While the optimal broadcast beam requires a solution of a quadratic programming problem, with quadratic constraints, the isotropic beam is also difficult to design. If the antenna response is known, a cosine tapered beam pattern is matched by a least squares fit. This seems to get good results and only requires knowledge of the antenna array.

Also, the results are compared against the performance of a unicast channel, from the basestation to an individual subscriber. In the broadcast mode the same broadcast message is delivered independently to multiple subscribers using the normal cellular infrastructure.

Figure 11:
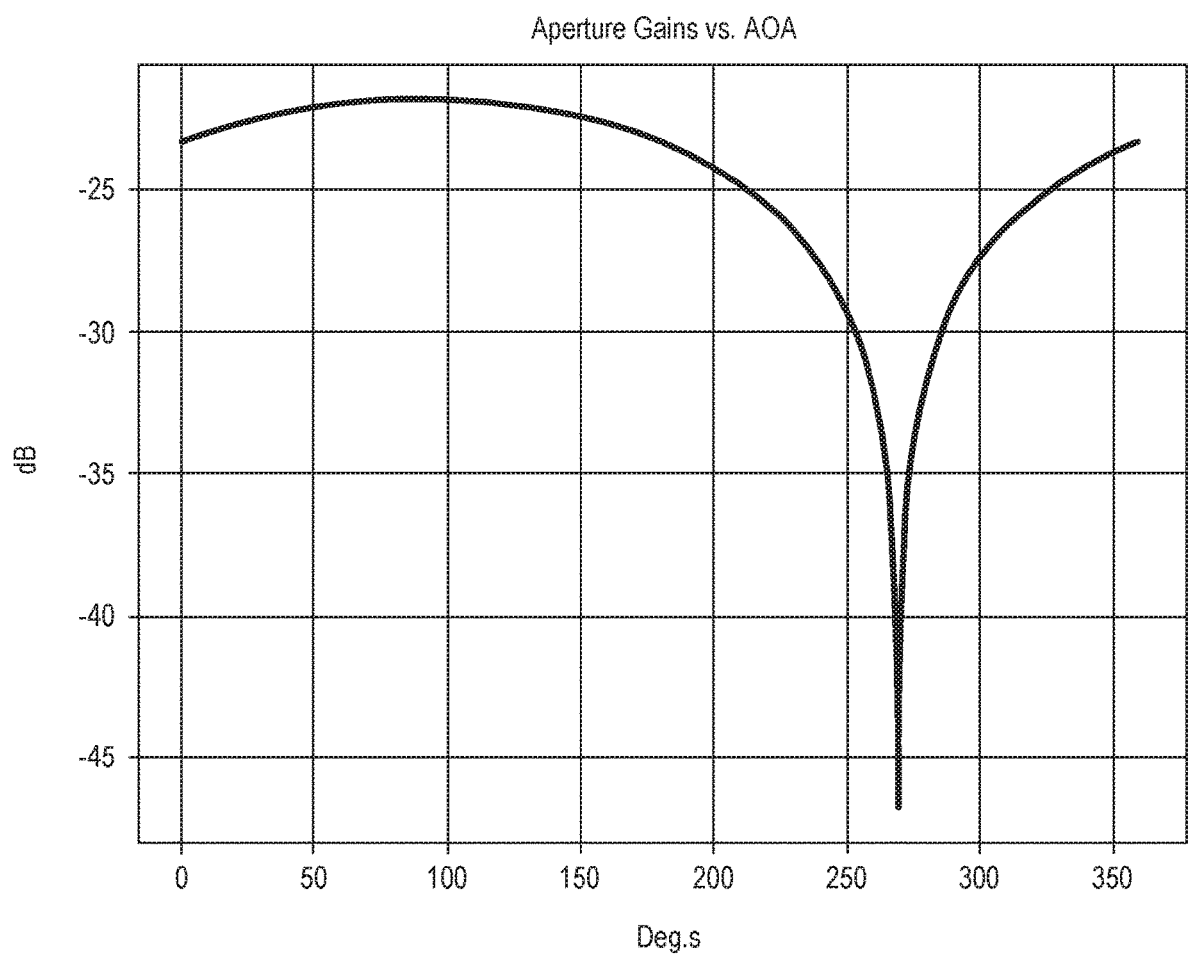
FIG. 11 is a flowchart of aperture gains versus angle of arrival (AOA).

Each basestation (enodeB) antenna element has a cardioid gain pattern. The gain patterns have a 12.0 dB peak gain, a 25.0 dB front to back ratio, and a 120.0 degree 3 dB beam width. This is shown in FIG. 11 for an 8 antenna element array.

Figure 12:
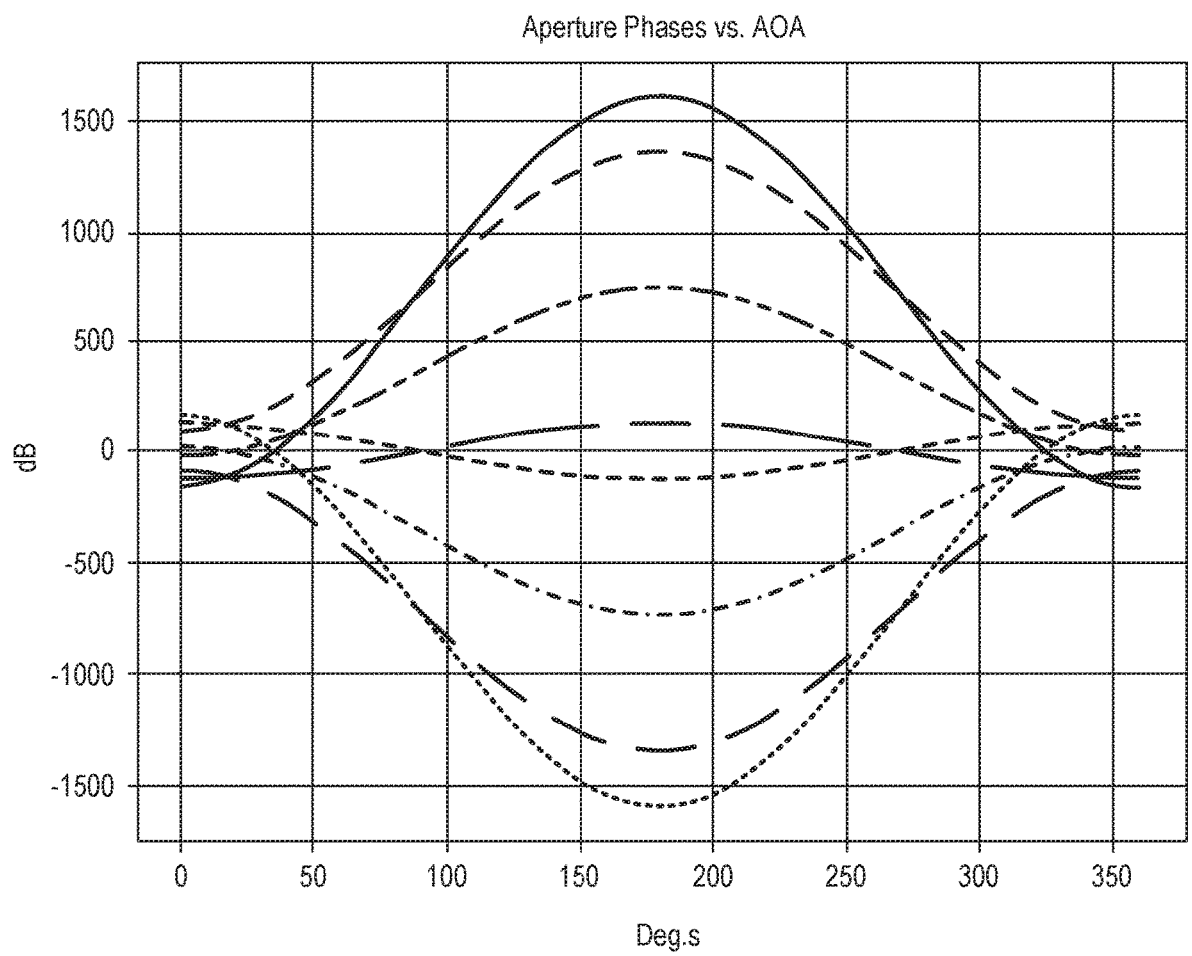
FIG. 12 is base antenna phase versus AOA.
Figure 13:
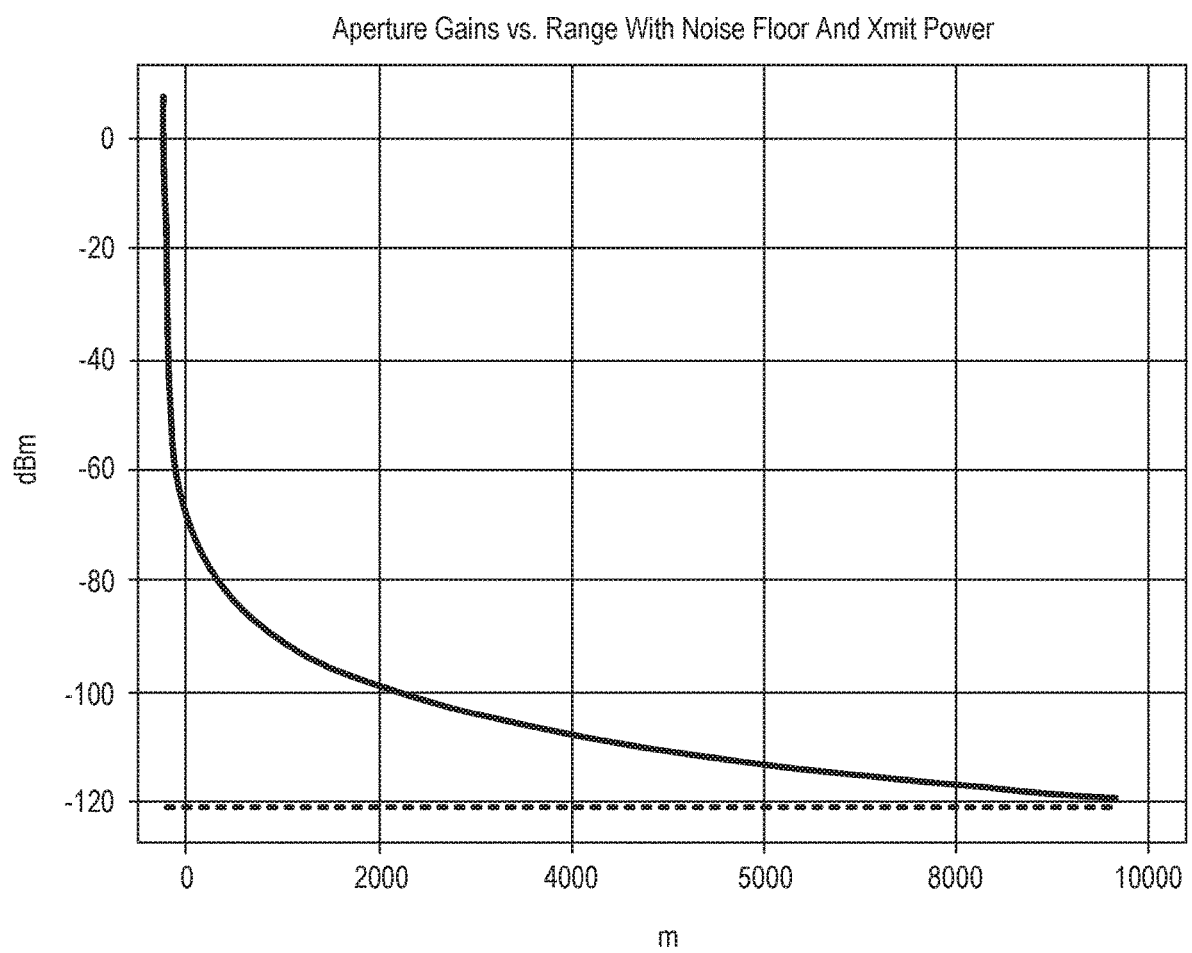
FIG. 13 is a base antenna game chart versus a range with a noise floor and transmit power.

The base phase response is shown in FIG. 12. The path loss as a function of range, without the shadowing effects is shown in FIG. 13. The maximum transmit power for a single LTE resource block is added. That power is assumed to be 29.01 dBm. Additionally the plot shows the thermal noise floor for an assumed temperature of 300.0 degrees Kelvin and a 180.0 kHz bandwidth, corresponding to the minimal LIE resource block.

Figure 14:
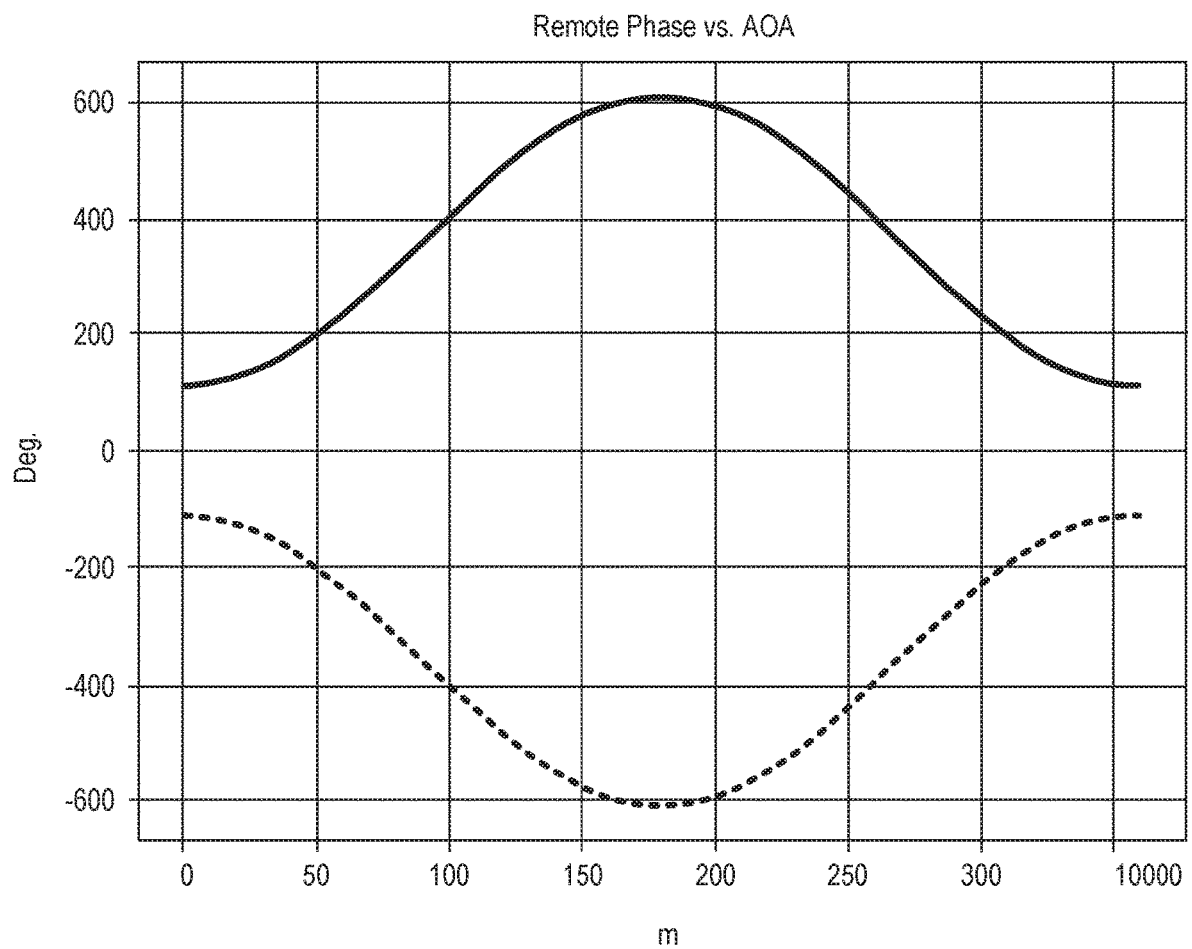
FIG. 14 is a remote antenna phase versus AOA.

Shadowing gains are applied to the remote array antenna, which are isotropic, but their phase response is shown FIG. 14. A log normal shadowing deviation of 8 dB is used in the simulation.

Note the base antennas for a sector form a linear array with a 0.7 lambda separation. In this example, there are a total of 8 base antennas and two remote unit antennas. The remote unit user terminal antennas are assumed to lie on a circle of radius 8.0 centimeters.

Figure 15:
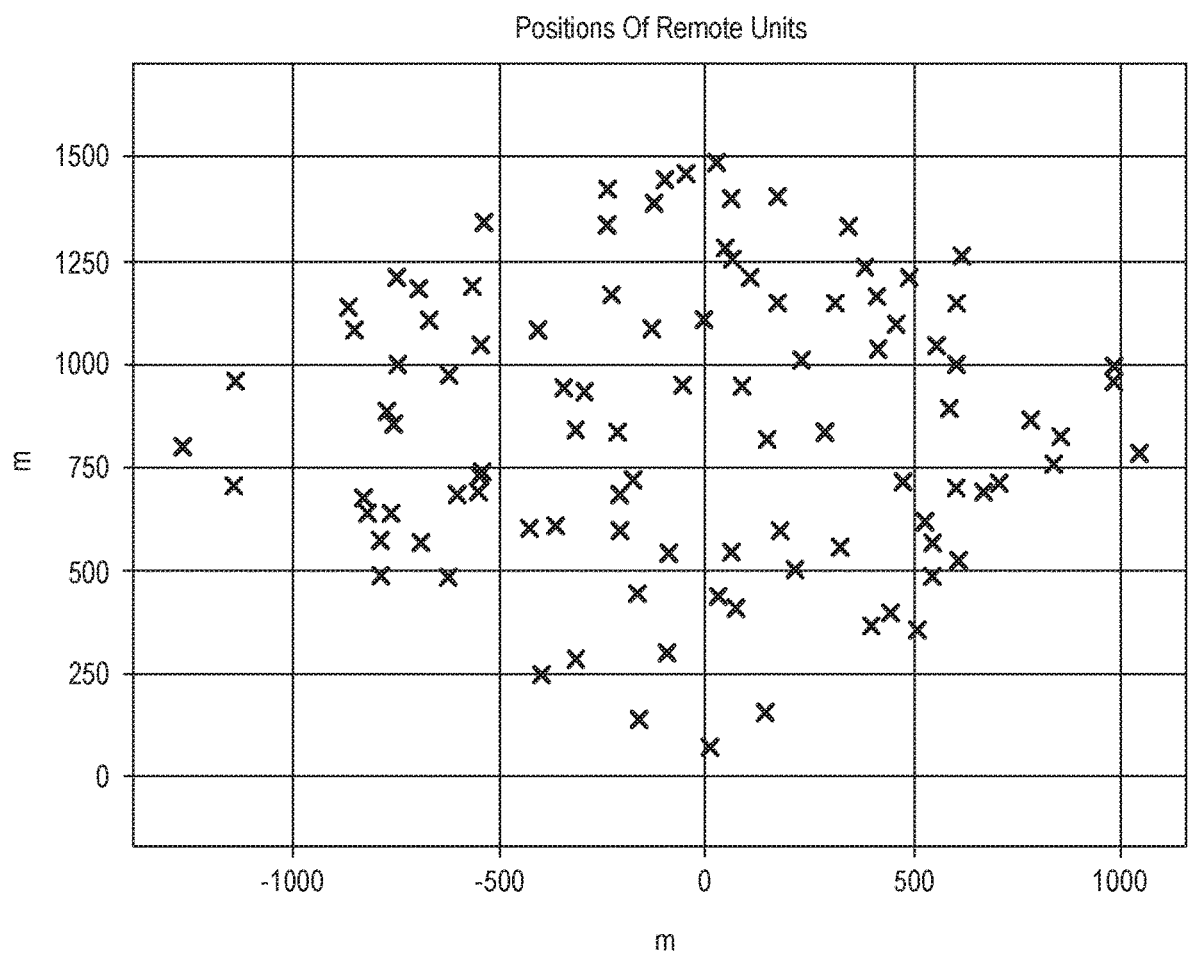
FIG. 15 is a chart of a position of remote unit versus a cell tower.

For this simulation remote units in a defined sector are generated. 100 user terminals are placed in a 120 degree sector in a cell of radius 1500.0 meters in FIG. 15. Transmit weights that meet an arbitrary SINR target over all the user terminals are found, with minimum power.

For the 120 degree sector, the broadcast weights typically have a 6-10 dB performance improvement over the isotropic weights, suggesting that optimizing the weights is well worth the effort, provided that channel state information (CSI) is readily available at the basestation. This is not an unreasonable assumption if full deployment of MU-MIMO in LTE cellular networks is anticipated.

Figure 16:
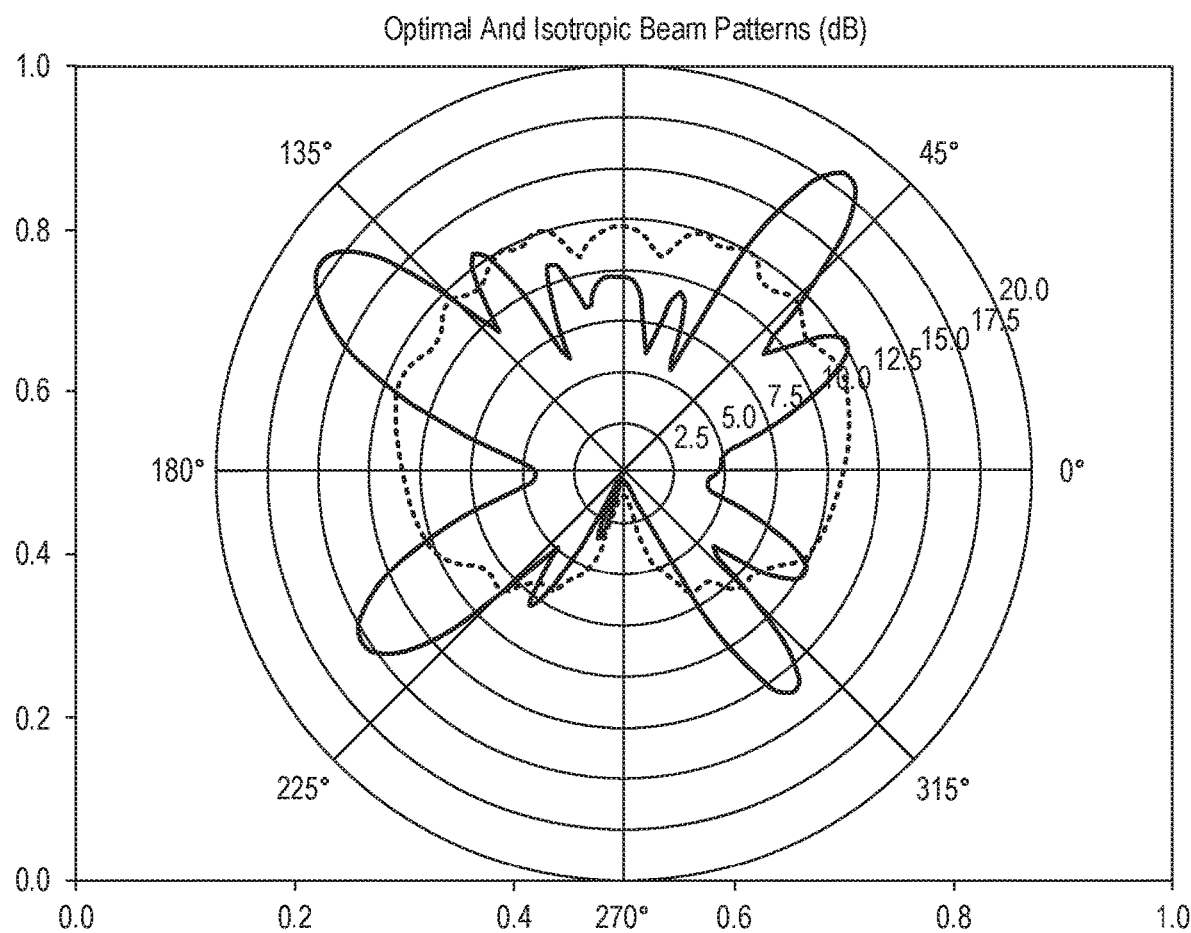
FIG. 16 is an example of a broadcast isotopic beam pattern.

It is interesting to note that the gains are this significant even when attempting to broadcast to as many as 100 user terminals in a single sector simultaneously. The optimal beam patterns for the broadcast case and for the isotropic case are compared, as seen in FIG. 16. The broadcast beam pattern attempts to enhance the lower performing user terminals and thus has a somewhat irregular shape compared to the isotropic case.

Figure 17:
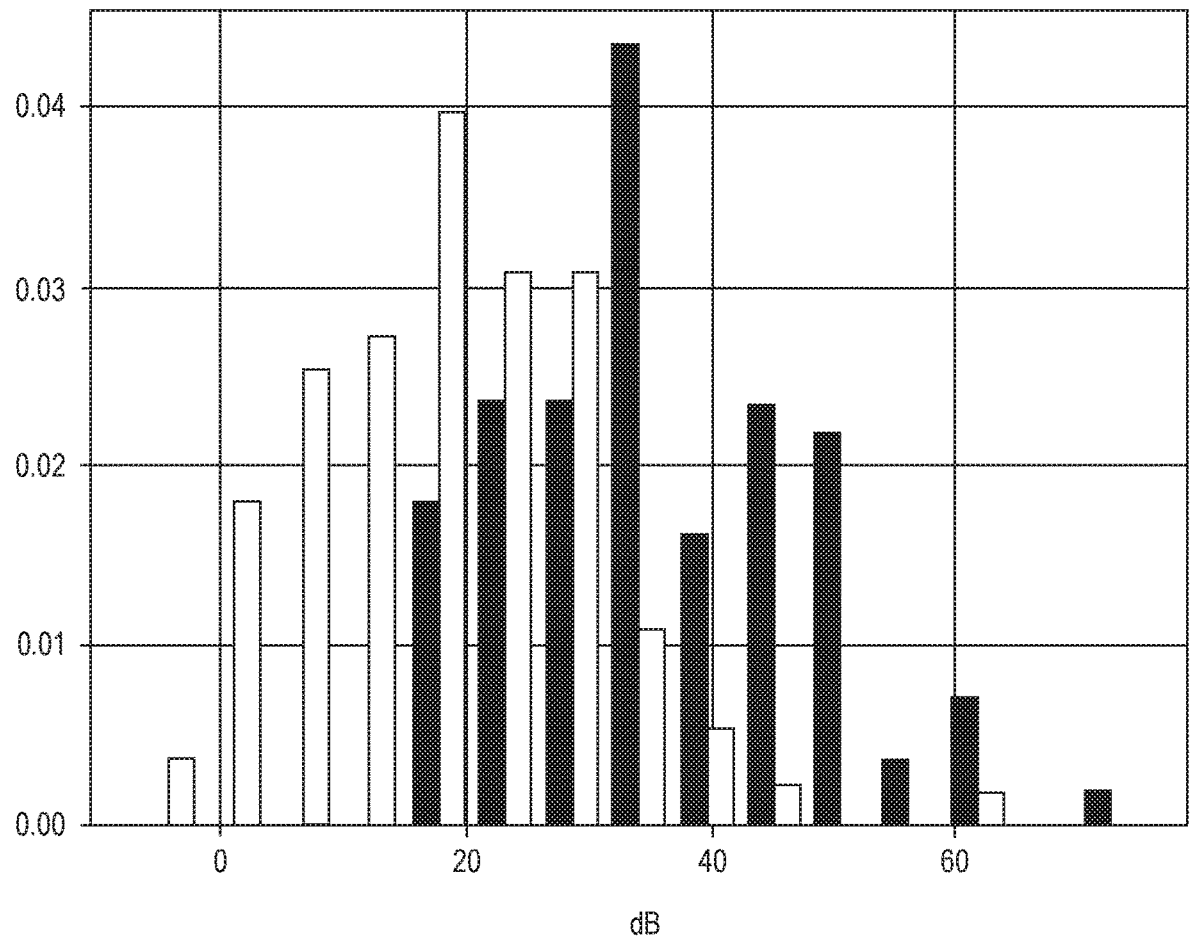
FIG. 17 is a histogram of received signal-to-noise ratio for a broadcast isotropic beam.

That irregular shape however may provide significant performance gains as the SNR histogram in FIG. 17 shows. The received SNRs for the broadcast beam nearly uniformly outperforms the more simplistic isotropic beam.

The performance of the broadcast beamformer, the isotropic beamformer and the unicast MU-MIMO link as a function of a parameter that is varied. The performance is measured by the spectral efficiency in bits per second per Hz, per subscriber unit. For convenience this ids computed by computing the Shannon capacity reduced by a CODEC loss factor of L, set to 4.5 dB. This may be written as function of SINR, $$C(\gamma) = \log_2\left(1 + \frac{\gamma}{L}\right) \quad (25)$$

This formula shows approximate agreement with reported LTE error correcting CODECs.

To compute the MU-MIMO capacity result, it is assumed that the number of co-channel remotes may be spatially separate and is equal to the number of base antennas divided by 4. This is a rather optimistic assumption due to adjacent cell interference, and the channel sounding techniques in current use.

It is assume that there will be 2 independent MIMO channels for each link. Every such MIMO channel it is assumed that a 5 dB smaller path gain than the main path. As a result the following formula is used for our MU-MIMO capacity:

$$C_{MIMO}(\gamma) = \frac{M_{base}}{4N_{rems}}(C(\gamma) + (N_{paths} - 1)C(\gamma/3.16)) \quad (26)$$

where $C_{MIMO}$ is the MIMO spectral efficiency, $N_{rems}$ is the number of remote units, $M_{base}$ is the number of basestation antennas, $\gamma$ is the SINR, and $N_{paths}$ is the number of usable MIMO paths per link. The target SINR for the MU-MIMO links is set at a generous 21.0 dB.

For most of the numerical tests, the worst case remote units are culled or removed, after sorting their performance using the isotropic beamformer. This is so that mitigating the problem of outlying bad links dominating the performance results. Fortunately it is not quite as strong an effect as initially presumed.

Figure 18:
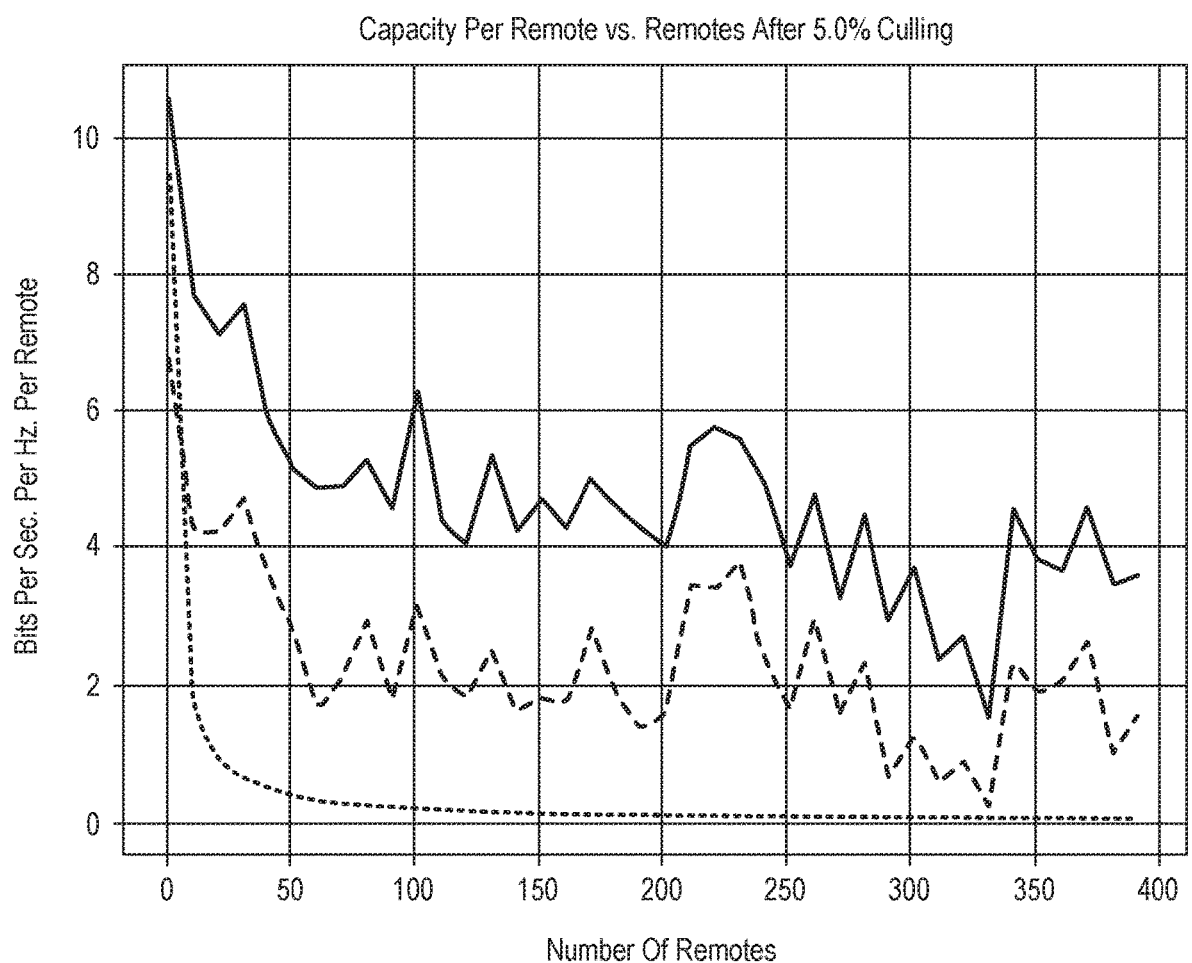
FIG. 18 is a capacity per remote versus the number of remotes after 5% culling.

The performance as the number of remotes is varied in FIG. 18. This run culls 5 percent of the worst remotes. The dotted line is the MU-MIMO performance and the blue line is the broadcast beam performance. The broadcast beam consistently achieves 2-3 bits per second per Hz more than the isotropic beam, even for large number of remotes in the cellular sector. The MU-MIMO unicast approach is surpassed at around 6 remotes in this configuration, with only 2 exploitable multipath rays.

Figure 19:
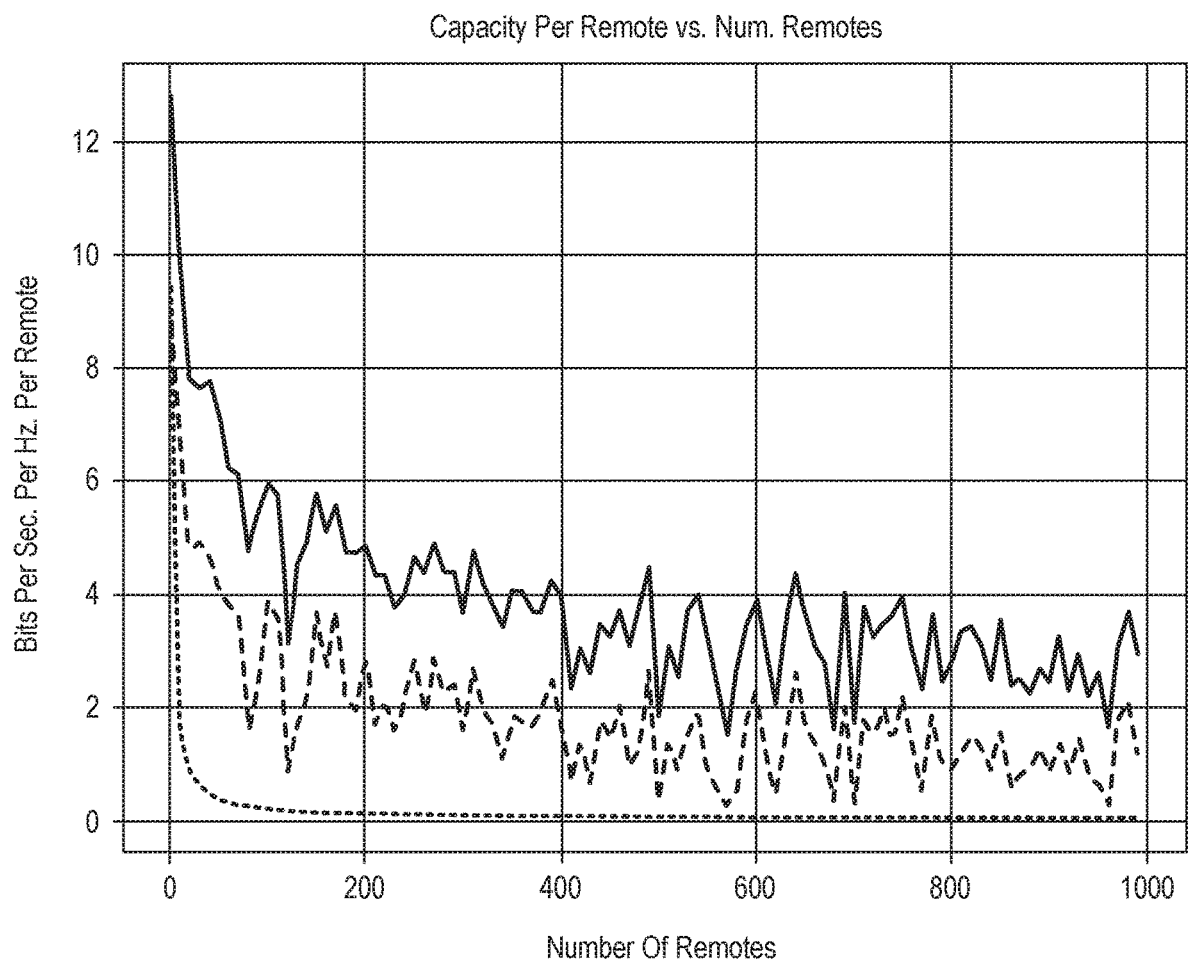
FIG. 19 is a chart of capacity per remote versus the number of remotes.

As the number of remotes increase the broadcast beam performance only decreases very slowly, seemingly hitting an asymptote of 3 bits per second per Hz. This is more clearly seen in the longer run in FIG. 19, with up to 1000 remote units. This result was obtained without doing any remote unit culling or excluding.

Figure 20:
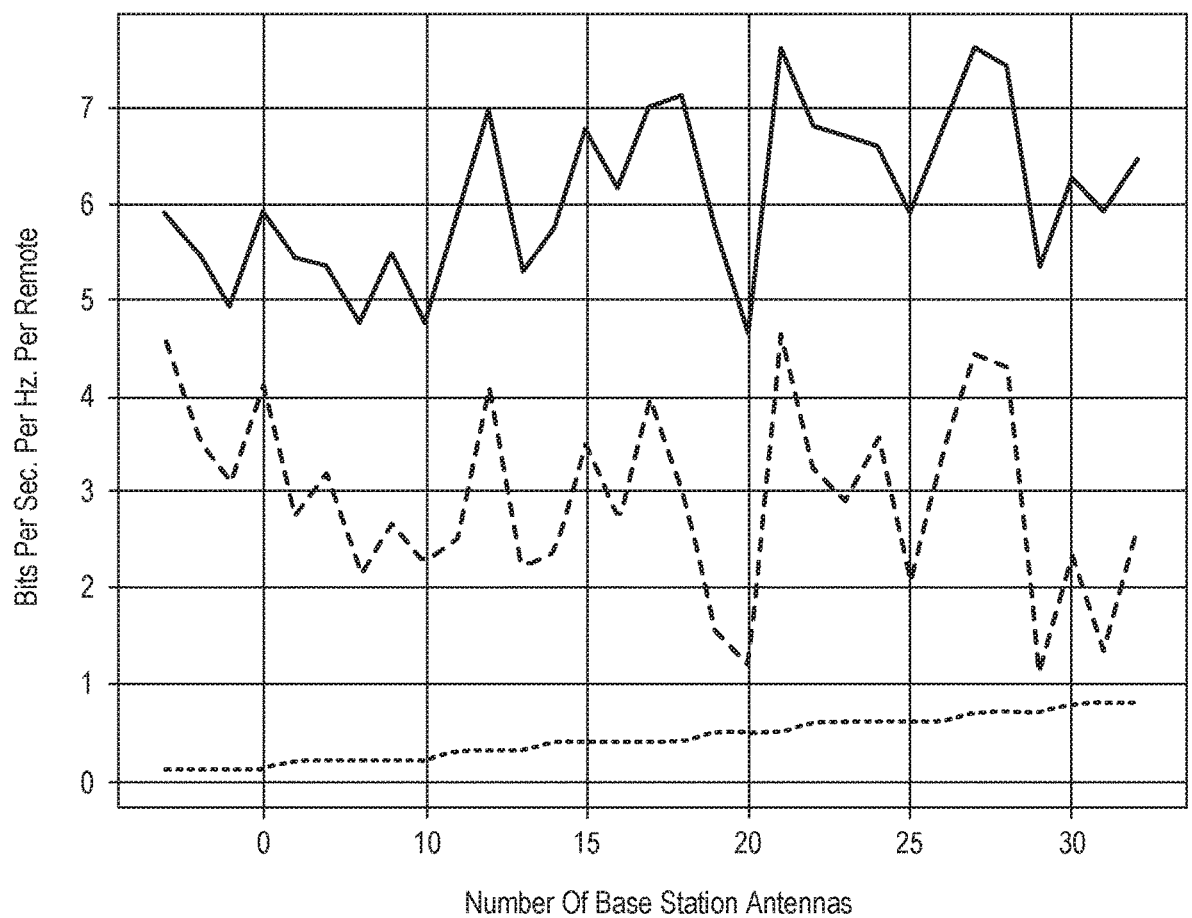
FIG. 20 is a capacity per remote versus of a number of base antennas after 5% culling.

In FIG. 20 the efficiency as a function of the number of basestation antennas is shown. This a parameter that is especially helpful to the MU-MIMO solution, provided that the spatial channel for co-channel communications may be used. It also helps the broadcast channel since it improves the overall beamformer performance, both in gain and in the number of remote unit constraints it may satisfy.

Figure 21:
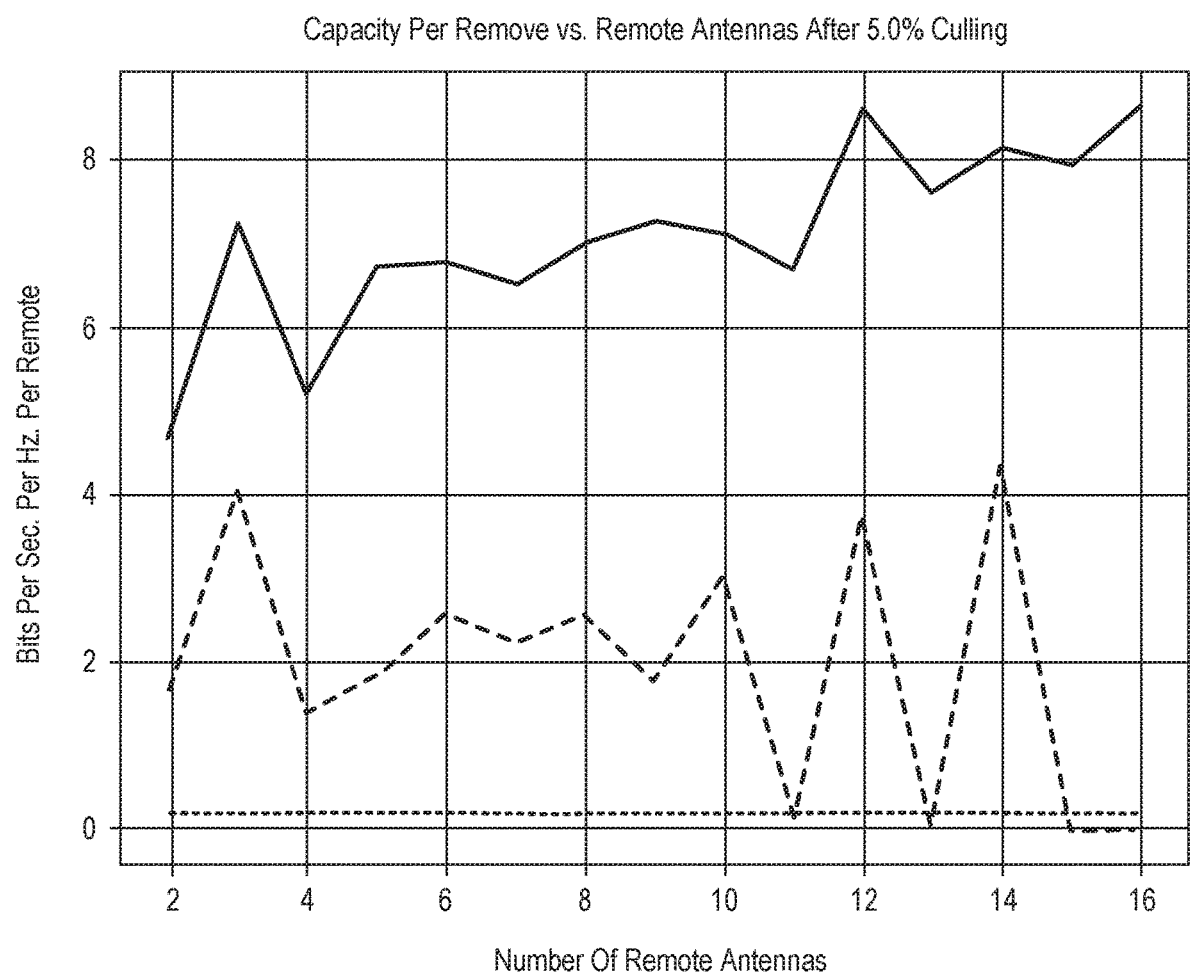
FIG. 21 is a flowchart of capacity per remote versus the number of remote antennas after 5% culling.

The remote antennas are varied in FIG. 21. This primarily benefits the broadcast beamformer, however it also theoretically helps with out of cell interference, which is currently not modeled here. The remote unit antennas provide a processing gain that causes the SINR to increase linearly with the number of antennas, hence increasing the capacity logarithmically. Theoretically it would help the MU-MIMO case as well, the number of usable MIMO paths may be increased. The isometricbeam performance is noisier, no doubt due to the challenge of maintaining an iso-beam as the number of antennas increases.

Figure 22:
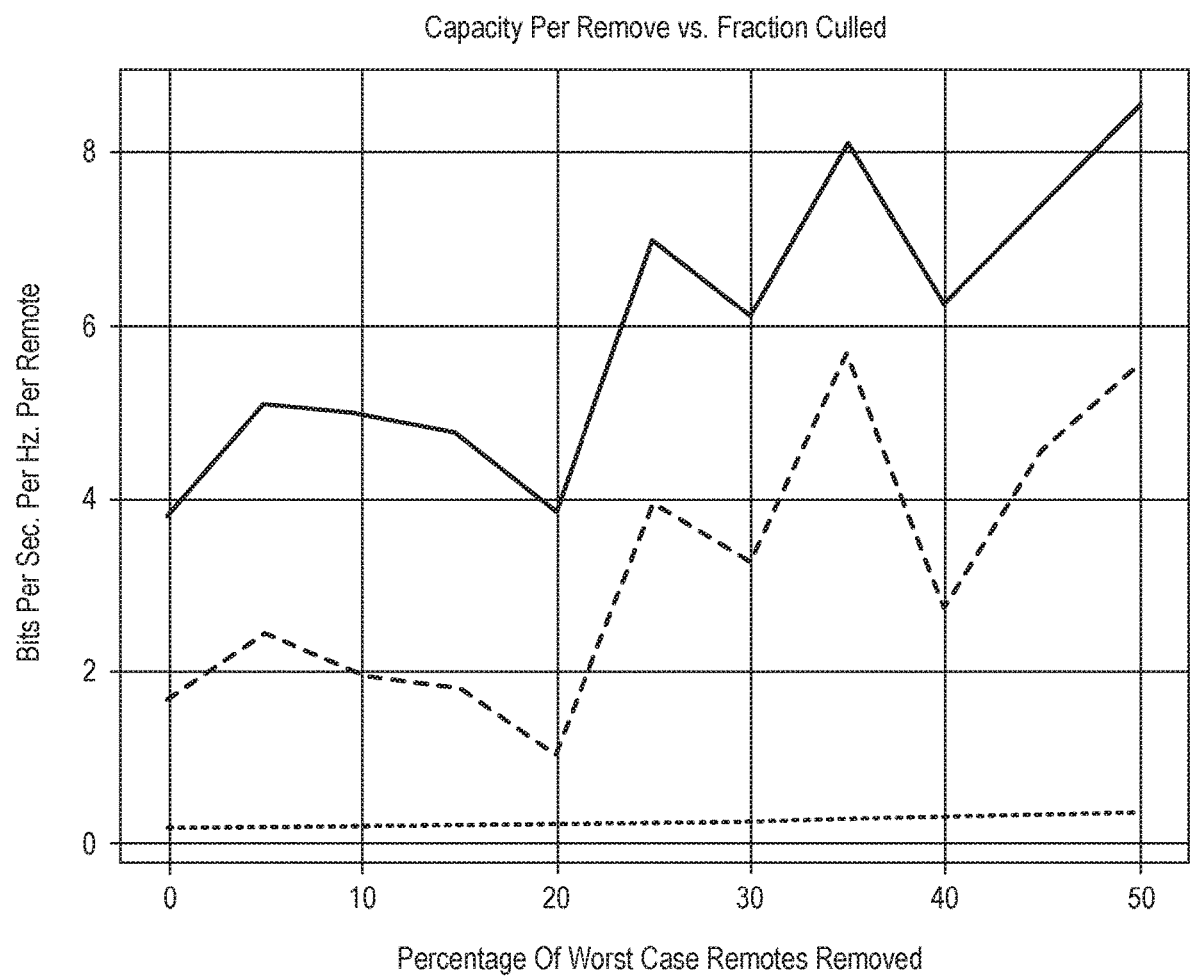
FIG. 22 is a chart of spectral efficiency versus the number of remotes culled.

In FIG. 22 the number of remote devices culled from a 120 degree sector with 100 remote units is varied. The performance for all the candidate beamformers improves the most challenged links are removed and have fewer remotes to service.

Figure 23:
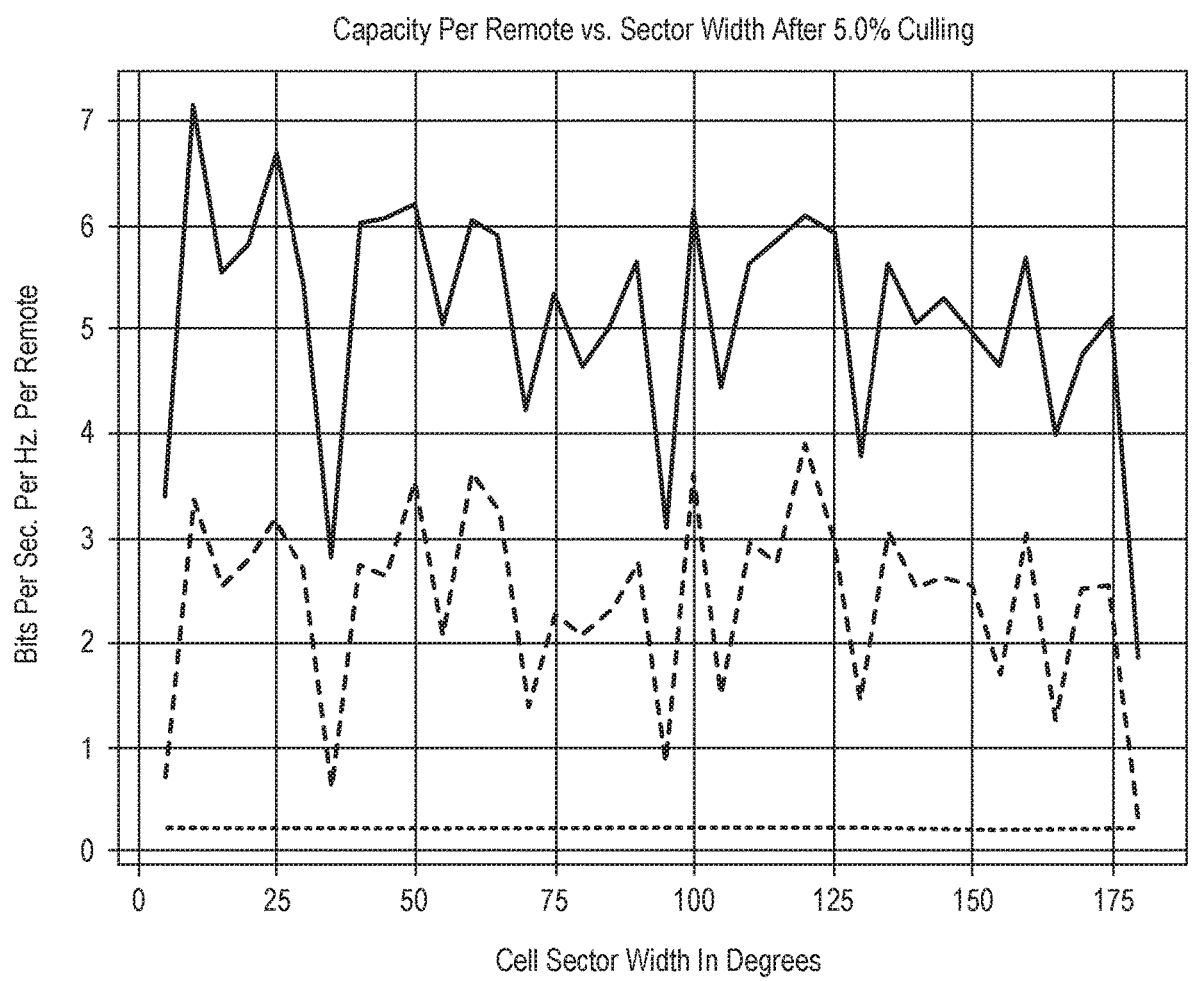
FIG. 23 is the spectral efficiency versus the sector beam width.

Finally, in FIG. 23 the size of the basestation sector is varied, while keeping the total number of remotes at 100. The smaller sectors do help the broadcast beamformer, however the effect is smaller than anticipated. Given only 1 bit per second per Hz improvement over the 120 degree sector, it seems hard to justify the idea of reusing over time, a 5 or 10 degree sector and sweeping over the cell by incrementing the sector angle.

Broadcasting therefore appears much better than unicasting content unless the number of subscribers is 10 or smaller there is not much point in looking at unicast. Using the broadcast beamformer effectively entails both channel sounding and a nonlinear optimization problem to solve the quadratic constraint minimizer Those skilled in the art may now appreciate from the foregoing description that the broad teachings of the disclosure may be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
communicating a sounding signal to a plurality of devices through a first antenna array coupled to a basestation;
in response to the sounding signal, communicating a response signal to the basestation from each of the plurality of devices, from the response signal determining device data comprising a device location, a signal strength of the sounding signal and phase information of the sounding signal;
grouping the plurality of devices into a first group based on the device data;
generating first transmit beamforming weights for the first group to shape a power output of the first antenna array into higher power and lower power regions for communicating a data signal to the first group; and
broadcasting the data signal to the first group through a wireless signal from the first antenna array using the first transmit beamforming weights.

2. The method of claim 1 further comprising identifying remnant capacity of a communication system and wherein broadcasting comprises broadcasting the data signal within the remnant capacity of an overall system capacity, the overall system capacity comprising a first portion of a broadcast transmission used for communicating the data signal for real time consumption by the plurality of devices and the remnant capacity separate from the first portion of the broadcast transmission for non-real time consumption.

3. The method of claim 2 wherein communicating the data signal using the remnant capacity comprises communicating the data signal using an unused or under-used resource.

4. The method of claim 2 wherein the overall system capacity comprises a broadcast mode and a unicast mode.

5. The method of claim 4 wherein broadcasting the data signal is performed in the broadcast mode.

6. The method of claim 4 further comprising communicating the data signal to a first device outside the first group through the first antenna array using the unicast mode.

7. The method of claim 6 further comprising determining the first device based on a broadcast coverage and throughput tradeoff.

8. The method of claim 6 further comprising determining the first device based on a broadcast coverage and modulation and coding scheme.

9. The method of claim 6 further comprising determining the first device based on a first modulation and coding scheme.

10. The method of claim 6 further comprising determining the first device based on comparing a use of different modulation and coding schemes.

11. The method of claim 6 further comprising determining the first device based on signal strength.

12. The method as recited in claim 1 further comprising communicating the data signal to cellular users for real time consumption by the cellular users using a first portion of an overall system capacity of a terrestrial cellular communication system during a first time, said overall system capacity comprising the first portion and remnant capacity separate from the first portion, wherein said real time consumption occurring at a same time as when a user requests to consume said data signal, wherein broadcasting the data signal comprises broadcasting the data signal using the remnant capacity.

13. The method of claim 1 wherein broadcasting the data signal to the first group of devices comprises broadcasting the data signal to intermediate devices and storing the data signal in the intermediate devices.

14. The method of claim 13 further comprising after storing the data signal, requesting the data signal, by a user application, from a first intermediate device of the intermediate devices, at a second time that is different than a first time corresponding to real time consumption.

15. The method of claim 14 further comprising communicating the data signal from the first intermediate device of a first device to the user application after storing the data signal.

16. The method of claim 14 further comprising after broadcasting the data signal, receiving the data signal from the first intermediate device and consuming the data signal at the user application in real time.

17. The method of claim 14 wherein the first intermediate device is disposed at a cell tower, and further comprising communicating the data signal from the first intermediate device to a first device by communicating the data signal through a wireless network originating at the cell tower.

18. The method of claim 14 wherein the user application is disposed in a cellular user device.

19. The method of claim 1 wherein the plurality of devices comprise cellular user devices.

20. The method of claim 1 further comprising including at least a first user application in a broadcast of the data signal from a second antenna array spaced apart from the first antenna array.

21. The method of claim 1 further comprising forming a first clump and a second clump within the first group and directing lobes of the first antenna array to the first clump and the second clump.

22. The method of claim 1 wherein the response signal comprises an uplink feedback.

23. The method of claim 1 wherein after broadcasting the data signal, determining a reception quality; and
grouping the plurality of devices into a second group based on the reception quality.

24. The method of claim 23 wherein the reception quality comprises error rate.

25. The method of claim 23 wherein reception quality comprises received throughputs.

26. The method of claim 23 wherein grouping the plurality of devices into the second group comprises grouping the plurality of devices into a second group based on the reception quality and the device data.

27. The method of claim 23 wherein grouping the plurality of devices into the second group comprises grouping the plurality of devices into a second group based on the reception quality and a broadcast coverage and throughput tradeoff.

28. The method of claim 23 wherein grouping the plurality of devices into the second group comprises grouping the plurality of devices into a second group based on the reception quality and comparing a use of different modulation and coding schemes.

29. The method of claim 28 wherein grouping the plurality of devices into the second group comprises grouping the plurality of devices into a second group based on the reception quality and signal strength.

30. The method of claim 1 wherein broadcasting the data signal comprises transmitting the data signal using multiple transmit weights to remote receivers with multiple antennas.

31. The method of claim 1 wherein generating first transmit beamforming weights comprises generating first transmit beamforming weights using interior point barrier functions over a plurality of basestations.

32. The method of claim 1 further comprising transmitting to the plurality of devices over multiple basestations or multiple remote units, or both synchronously.

33. The method of claim 32 further comprising simultaneously communicating the data signal using a first device using a first signal from a first basestation and second signal from a second basestation and simultaneously receiving the first signal and the second signal to increase a modulation and coding scheme for the data signal.

34. The method claim 33 further comprising adjusting second transmit beamforming weights of the first basestation and third transmit beamforming weights of the second basestation to simultaneously transmit the data signal from the first basestation and the second basestation.

35. The method of claim 34 wherein the second transmit beamforming weights comprise the first transmit beam forming weights.

36. The method of claim 1 wherein generating first transmit beamforming weights comprises generating the first transmit beamforming weights using minimum mean square error processing.

37. The method of claim 1 wherein generating first transmit beamforming weights comprises generating the first transmit beamforming weights using a simplified objective function.

38. The method of claim 1 wherein generating first transmit beamforming weights comprises generating the first transmit beamforming weights using a convex approximation model.

39. The method of claim 1 wherein generating first transmit beamforming weights comprises generating the first transmit beamforming weights using relaxation techniques and rank approximations.

40. The method of claim 1 wherein generating first transmit beamforming weights comprises generating normalized first transmit beamforming weights using noise covariance.

41. The method of claim 1 wherein generating first transmit beamforming weights comprises generating the first transmit beamforming weights using differing quality levels by setting capacity constraints appropriately in a linear weight optimization function.

42. The method of claim 1 wherein grouping the plurality of devices into the first group comprises grouping the plurality of devices based on a broadcast coverage and throughput tradeoff.

43. The method of claim 1 wherein grouping the plurality of devices into the first group comprises grouping the plurality of devices based on a first modulation and coding scheme.

44. The method of claim 1 wherein grouping the plurality of devices into the first group comprises grouping the plurality of devices by comparing a use of different modulation and coding schemes.

45. The method of claim 1 wherein grouping comprises excluding at least one of the plurality of devices based on signal strength.

46. A system coupled to a basestation comprising:
a first antenna array associated with the basestation communicating a sounding signal to a plurality of devices;
an optimization circuit receiving a response signal from each of the plurality of devices and from the response signal determining device data comprising a device location, a signal strength of the sounding signal and phase information of the sounding signal, said optimization circuit grouping the plurality of devices into a first group based on the device data;
a beamformer generating first transmit beamforming weights for the first group to shape a power output of the first antenna array into higher power and lower power regions for communicating a data signal to the first group; and
the first antenna array broadcasting the data signal to the first group through a wireless signal using the first transmit beamforming weights.

47. The system of claim 46 further comprising a communication system provider identifying remnant capacity of a communication system and wherein the first antenna array broadcasts the data signal within the remnant capacity of an overall system capacity, the overall system capacity comprising a first portion of a broadcast transmission used for communicating the data signal for real time consumption by the plurality of devices and the remnant capacity separate from the first portion of the broadcast transmission for non-real time consumption.

48. The system of claim 47 wherein the first antenna array communicates the data signal using the remnant capacity by using an unused or under-used resource.

49. The system of claim 47 wherein the overall system capacity comprises a broadcast mode and a unicast mode.

50. The system of claim 49 wherein the data signal is communicated in the broadcast mode.

51. The system of claim 49 wherein the first antenna array communicates the data signal to a first device outside the first group using the unicast mode.

52. The system of claim 51 wherein a processing unit determines the first device based on a broadcast coverage and throughput tradeoff.

53. The system of claim 51 wherein a processing unit determines the first device based on a broadcast coverage and modulation and coding scheme.

54. The system of claim 51 wherein a processing unit determines the first device based on a first modulation and coding scheme.

55. The system of claim 51 wherein a processing unit determines the first device based on comparing a use of different modulation and coding schemes.

56. The system of claim 51 wherein a processing unit determines the first device based on signal strength.

57. The system of claim 46 wherein the first antenna array communicates the data signal to cellular users for real time consumption by the cellular users using a first portion of an overall system capacity of a terrestrial cellular communication system during a first time, said overall system capacity comprising the first portion and remnant capacity separate from the first portion, wherein said real time consumption occurring at a same time as when a user requests to consume said data signal, wherein broadcasting the data signal comprises broadcasting the data signal using the remnant capacity.

58. The system of claim 46 wherein the first antenna array broadcasts the data signal to intermediate devices that store the data signal therein.

59. The system of claim 58 wherein the intermediate devices store the data signal, and a user application requests the data signal from a first intermediate device of the intermediate devices, at a second time that is different than a first time corresponding to real time consumption.

60. The system of claim 59 wherein the first intermediate device communicates the data signal from the first intermediate device of a first device to the user application after storing the data signal.

61. The system of claim 59 wherein the user application receives the data signal from the first intermediate device after broadcasting the data signal and consuming the data signal in real time.

62. The system of claim 59 wherein the first intermediate device is disposed at a cell tower, and further comprising communicating the data signal from the first intermediate device to a first device by communicating the data signal through a wireless network originating at the cell tower.

63. The system of claim 59 wherein the user application is disposed in a cellular user device.

64. The system of claim 46 wherein the plurality of devices comprise cellular user devices.

65. The system of claim 46 wherein a second antenna array spaced apart from the first antenna array includes at least a first user application in a broadcast of the data signal.

66. The system of claim 46 further comprising a first clump and a second clump within the first group, and wherein lobes of the first antenna array are directed to the first clump and the second clump.

67. The system of claim 46 wherein the response signal comprises an uplink feedback.

68. The system of claim 46 wherein after broadcasting the data signal, a processing unit determines a reception quality and groups the plurality of devices into a second group based on the reception quality.

69. The system of claim 68 wherein the reception quality comprises error rate.

70. The system of claim 68 wherein reception quality comprises received throughputs.

71. The system of claim 68 wherein a processing unit groups the plurality of devices into the second group based on the reception quality and the device data.

72. The system of claim 68 wherein a processing unit groups the plurality of devices into the second group based on the reception quality and a broadcast coverage and throughput tradeoff.

73. The system of claim 68 wherein a processing unit groups the plurality of devices into the second group based on the reception quality and comparing a use of different modulation and coding schemes.

74. The system of claim 68 wherein a processing unit groups the plurality of devices into the second group based on the reception quality and signal strength.

75. The system of claim 46 wherein the first antenna array transmits the data signal using multiple transmit weights to remote receivers with multiple antennas.

76. The system of claim 46 wherein the beamformer generates first transmit beamforming weights using interior point barrier functions over a plurality of basestations.

77. The system of claim 46 further comprising multiple base stations or multiple remote units, or both transmitting to the plurality of devices synchronously.

78. The system of claim 77 further comprising simultaneously communicating data signal using a first device using a first signal from a first basestation and second signal from a second basestation and simultaneously receiving the first signal and the second signal to increase a modulation and coding scheme for the data signal.

79. The system claim 78 wherein the beamformer adjusts second transmit beamforming weights of the first basestation and third transmit beamforming weights of the second basestation to simultaneously transmit the data signal from the first basestation and the second basestation.

80. The system of claim 79 wherein the second transmit beamforming weights comprise the first beamforming weights.

81. The system of claim 46 wherein the beamformer generates first transmit beamforming weights using minimum mean square error processing.

82. The system of claim 46 wherein the beamformer generates first transmit beamforming weights using a simplified objective function.

83. The system of claim 46 wherein the beamformer generates first transmit beamforming weights using a convex approximation model.

84. The system of claim 46 wherein the beamformer generates first transmit beamforming weights using relaxation techniques and rank approximations.

85. The system of claim 46 wherein the beamformer generates first transmit beamforming weights using noise covariance.

86. The system of claim 46 wherein the beamformer generates first transmit beamforming weights comprises using differing quality levels by setting capacity constraints appropriately in a linear weight optimization function.

87. The system of claim 46 wherein a processing unit groups the plurality of devices into the first group based on a broadcast coverage and throughput tradeoff.

88. The system of claim 46 wherein a processing unit groups the plurality of devices into the first group based on a first modulation and coding scheme.

89. The system of claim 46 wherein a processing unit groups the plurality of devices by comparing a use of different modulation and coding schemes.

* * * * *